(12) United States Patent
Wu et al.

(10) Patent No.: US 10,819,555 B2
(45) Date of Patent: Oct. 27, 2020

(54) SIGNAL TRANSMISSION METHOD AND APPARATUS

(71) Applicant: Huawei Technologies Co., Ltd., Shenzhen, Guangdong (CN)

(72) Inventors: Tao Wu, Shenzhen (CN); Min Yan, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/252,200

(22) Filed: Jan. 18, 2019

(65) Prior Publication Data
US 2019/0173729 A1    Jun. 6, 2019

Related U.S. Application Data

(63) Continuation of application No. PCT/CN2017/089160, filed on Jun. 20, 2017.

(30) Foreign Application Priority Data
Jul. 19, 2016   (CN) .......................... 2016 1 0569237

(51) Int. Cl.
*H04L 27/26* (2006.01)
*H04L 27/36* (2006.01)
(Continued)

(52) U.S. Cl.
CPC ......... *H04L 27/362* (2013.01); *H04B 7/0456* (2013.01); *H04L 5/0007* (2013.01);
(Continued)

(58) Field of Classification Search
CPC . H04L 27/362; H04L 5/0007; H04L 27/3488; H04L 27/183; H04L 27/2627;
(Continued)

(56) References Cited

U.S. PATENT DOCUMENTS 7,359,311 B1   4/2008 Paranjpe et al.
2002/0057254 A1   5/2002 Kurashima et al.
(Continued)

FOREIGN PATENT DOCUMENTS

CN    101136725 A    3/2008
CN    101409696 A    4/2009
(Continued)

OTHER PUBLICATIONS

EP/17830324.4-1215, Office Action, dated May 4, 2020.
(Continued)

*Primary Examiner* — Lakeram Jangbahadur
(74) *Attorney, Agent, or Firm* — Leydig, Voit & Mayer, Ltd.

(57) ABSTRACT

A signal transmission method includes: combining a plurality of low-order modulated signals into N modulated signals; and transmitting the N modulated signals on N subcarriers, where the N subcarriers are subcarriers on frequency domain resources of M channels, an $n^{th}$ modulated signal in the N modulated signals is transmitted on an $n^{th}$ subcarrier in the N subcarriers, N is an integer greater than or equal to 2, M is an integer greater than or equal to 2, and n=1, 2, ..., N. The signal transmission method can improve efficiency of a diversity gain.

14 Claims, 13 Drawing Sheets

(51) Int. Cl.
*H04L 27/18* (2006.01)
*H04L 27/34* (2006.01)
*H04L 5/00* (2006.01)
*H04B 7/0456* (2017.01)

(52) U.S. Cl.
CPC .......... *H04L 5/0092* (2013.01); *H04L 27/183* (2013.01); *H04L 27/2607* (2013.01); *H04L 27/2627* (2013.01); *H04L 27/3488* (2013.01); *H04L 5/001* (2013.01); *H04L 5/0046* (2013.01); *H04L 27/2626* (2013.01)

(58) Field of Classification Search
CPC .............. H04L 27/2607; H04L 5/0092; H04L 27/2626; H04L 5/0046; H04L 5/001; H04L 5/023; H04B 7/0456
See application file for complete search history.

(56) References Cited

U.S. PATENT DOCUMENTS

| | | | |
|---|---|---|---|
| 2007/0147526 A1 | 6/2007 | Kim et al. | |
| 2008/0225965 A1* | 9/2008 | Pi | H04L 1/0003 375/260 |
| 2009/0116571 A1 | 5/2009 | Imai et al. | |
| 2011/0033004 A1* | 2/2011 | Wang | H04L 27/2626 375/261 |
| 2013/0128996 A1* | 5/2013 | Nishikawa | H04L 27/2615 375/260 |
| 2015/0043596 A1* | 2/2015 | Lin | H04L 5/0048 370/437 |

FOREIGN PATENT DOCUMENTS

| | | | | |
|---|---|---|---|---|
| CN | 101414898 A | 4/2009 | | |
| CN | 101471757 A | 7/2009 | | |
| CN | 101631097 A | 1/2010 | | |
| CN | 101682497 A | 3/2010 | | |
| CN | 101765123 A | 6/2010 | | |
| CN | 104363192 A | 2/2015 | | |
| CN | 107623565 A | 1/2018 | | |
| EP | 2326055 A1 | 5/2011 | | |
| EP | 3480990 A1 * | 5/2019 | ......... | H04L 27/2042 |
| EP | 3480990 A1 | 5/2019 | | |
| JP | 2013514739 A | 4/2013 | | |
| WO | 2005046113 A2 | 5/2005 | | |
| WO | 2009128030 A1 | 10/2009 | | |
| WO | 2010103989 A1 | 9/2010 | | |

OTHER PUBLICATIONS

Lomayev et al., "Performance Comparison of Dual Carrier and Regular Modulations for SU-MIMO in 11ay," IEEE 802.11-16/0631r0, pp. 1-17, XP068119471 (May 2016).

* cited by examiner $$\begin{bmatrix} x_1 \\ x_2 \\ x_3 \\ x_4 \end{bmatrix} = \underbrace{\begin{bmatrix} \alpha_{11} & \alpha_{12} & \alpha_{13} & \alpha_{14} \\ \alpha_{21} & \alpha_{22} & \alpha_{23} & \alpha_{24} \\ \alpha_{31} & \alpha_{32} & \alpha_{33} & \alpha_{34} \\ \alpha_{41} & \alpha_{42} & \alpha_{43} & \alpha_{44} \end{bmatrix}}_{Q} \begin{bmatrix} s_1 \\ s_2 \\ s_3 \\ s_4 \end{bmatrix}$$

FIG. 10

$$\begin{bmatrix} x_1 \\ x_2 \\ x_3 \\ x_4 \end{bmatrix} = \frac{1}{\sqrt{2}} \underbrace{\begin{bmatrix} 1 & j & 0 & 0 \\ 0 & 0 & 1 & j \\ 0 & 0 & 1 & -j \\ 1 & -j & 0 & 0 \end{bmatrix}}_{Q} \begin{bmatrix} s_1 \\ s_2 \\ s_3 \\ s_4 \end{bmatrix}$$

FIG. 11

$$\begin{bmatrix} x_1 \\ x_2 \\ x_3 \\ x_4 \end{bmatrix} = \frac{1}{\sqrt{10}} \underbrace{\begin{bmatrix} 1 & j & 2 & 2j \\ 1 & j & 2 & 2j \\ -2 & -2j & 1 & j \\ -2 & -2j & 1 & j \end{bmatrix}}_{Q} \begin{bmatrix} s_1 \\ s_2 \\ s_3 \\ s_4 \end{bmatrix}$$

FIG. 12

$$\begin{bmatrix} x_1 \\ x_2 \\ x_3 \\ x_4 \end{bmatrix} = \frac{1}{\sqrt{5}} \underbrace{\begin{bmatrix} 1 & 2 & 0 & 0 \\ 0 & 0 & 1 & 2 \\ 0 & 0 & -2 & 1 \\ -2 & 1 & 0 & 0 \end{bmatrix}}_{Q} \begin{bmatrix} s_1 \\ s_2 \\ s_3 \\ s_4 \end{bmatrix}$$

FIG. 13

$$\begin{bmatrix} x_1 \\ x_2 \\ x_3 \\ x_4 \end{bmatrix} = \frac{1}{\sqrt{85}} \underbrace{\begin{bmatrix} 8 & 4 & 2 & 1 \\ 1 & 8 & 4 & 2 \\ 2 & 1 & 8 & 4 \\ 4 & 2 & 1 & 8 \end{bmatrix}}_{Q} \begin{bmatrix} s_1 \\ s_2 \\ s_3 \\ s_4 \end{bmatrix}$$

FIG. 14

$$\begin{bmatrix} x_1 \\ x_2 \\ x_3 \\ x_4 \end{bmatrix} = \frac{1}{\sqrt{5}} \underbrace{\begin{bmatrix} 1 & 2 & 0 & 0 \\ 0 & 0 & 1 & 2 \\ 0 & 0 & -2 & 1 \\ -2 & 1 & 0 & 0 \end{bmatrix}}_{Q} \begin{bmatrix} s_1 \\ s_2 \\ s_3 \\ s_4 \end{bmatrix}$$

FIG. 15

$$\begin{bmatrix} x_1 \\ x_2 \\ x_3 \\ x_4 \\ x_5 \\ x_6 \\ x_7 \\ x_8 \\ x_9 \end{bmatrix} = \underbrace{\begin{bmatrix} \alpha_{11} & \alpha_{12} & \alpha_{13} & \alpha_{14} & \alpha_{15} & \alpha_{16} & \alpha_{17} & \alpha_{18} & \alpha_{19} \\ \alpha_{21} & \alpha_{22} & \alpha_{23} & \alpha_{24} & \alpha_{25} & \alpha_{26} & \alpha_{27} & \alpha_{28} & \alpha_{29} \\ \alpha_{31} & \alpha_{32} & \alpha_{33} & \alpha_{34} & \alpha_{35} & \alpha_{36} & \alpha_{37} & \alpha_{38} & \alpha_{39} \\ \alpha_{41} & \alpha_{42} & \alpha_{43} & \alpha_{44} & \alpha_{45} & \alpha_{46} & \alpha_{47} & \alpha_{48} & \alpha_{49} \\ \alpha_{51} & \alpha_{52} & \alpha_{53} & \alpha_{54} & \alpha_{55} & \alpha_{56} & \alpha_{57} & \alpha_{58} & \alpha_{59} \\ \alpha_{61} & \alpha_{62} & \alpha_{63} & \alpha_{64} & \alpha_{65} & \alpha_{66} & \alpha_{67} & \alpha_{68} & \alpha_{69} \\ \alpha_{71} & \alpha_{72} & \alpha_{73} & \alpha_{74} & \alpha_{75} & \alpha_{76} & \alpha_{77} & \alpha_{78} & \alpha_{79} \\ \alpha_{81} & \alpha_{82} & \alpha_{83} & \alpha_{84} & \alpha_{85} & \alpha_{86} & \alpha_{87} & \alpha_{88} & \alpha_{89} \\ \alpha_{91} & \alpha_{92} & \alpha_{93} & \alpha_{94} & \alpha_{95} & \alpha_{96} & \alpha_{97} & \alpha_{98} & \alpha_{99} \end{bmatrix}}_{Q} \begin{bmatrix} s_1 \\ s_2 \\ s_3 \\ s_4 \\ s_5 \\ s_6 \\ s_7 \\ s_8 \\ s_9 \end{bmatrix}$$

FIG. 16

$$\begin{bmatrix} x_1 \\ x_2 \\ x_3 \\ x_4 \\ x_5 \\ x_6 \\ x_7 \\ x_8 \\ x_9 \end{bmatrix} = \frac{1}{\sqrt{21}} \underbrace{\begin{bmatrix} 4 & 2 & 1 & 0 & 0 & 0 & 0 & 0 & 0 \\ 0 & 0 & 0 & 4 & 2 & 1 & 0 & 0 & 0 \\ 0 & 0 & 0 & 0 & 0 & 0 & 4 & 2 & 1 \\ 0 & 0 & 0 & 0 & 0 & 0 & 1 & 4 & 2 \\ 1 & 4 & 2 & 0 & 0 & 0 & 0 & 0 & 0 \\ 0 & 0 & 0 & 1 & 4 & 2 & 0 & 0 & 0 \\ 0 & 0 & 0 & 2 & 1 & 4 & 0 & 0 & 0 \\ 0 & 0 & 0 & 0 & 0 & 0 & 2 & 1 & 4 \\ 2 & 1 & 4 & 0 & 0 & 0 & 0 & 0 & 0 \end{bmatrix}}_{Q} \begin{bmatrix} s_1 \\ s_2 \\ s_3 \\ s_4 \\ s_5 \\ s_6 \\ s_7 \\ s_8 \\ s_9 \end{bmatrix}$$

FIG. 17

SIGNAL TRANSMISSION METHOD AND APPARATUS

CROSS-REFERENCE TO RELATED APPLICATIONS

This application is a continuation of International Application No. PCT/CN2017/089160, filed on Jun. 20, 2017, which claims priority to Chinese Patent Application 201610569237.0, filed on Jul. 19, 2016. The disclosures of the aforementioned applications are hereby incorporated by reference in their entireties.

TECHNICAL FIELD

This application relates to the communications field, and more specifically, to a signal transmission method and apparatus.

BACKGROUND

Wireless local area network (WLAN) standards based on an orthogonal frequency division multiplexing (OFDM) technology include gradually evolved standards such as 802.11a, 802.11n, 802.11ac, and 802.11ad. Currently, the wireless high-definition audio and video signal transmission standard 802.11ad is mainly used to implement intra-home transmission of wireless high-definition audio and video signals, and provide a better high-definition video solution for a home multimedia application. In 802.11ad, crowded 2.4 GHz and 5 GHz frequency bands are abandoned, and a high-frequency carrier spectrum of 60 GHz is used.

Currently, a 60 GHz frequency band may be divided into four channels, and a bandwidth of each channel is 2.16 GHz. However, in 802.11ad, only one channel can be used at a time to transmit a signal. If only one channel is used to transmit a signal, more diversities cannot be flexibly implemented, and a diversity gain effect is not remarkable.

SUMMARY

Embodiments of this application provide a signal transmission method and apparatus, so as to improve efficiency of a diversity gain.

According to a first aspect, a signal transmission method is provided, including:

combining a plurality of low-order modulated signals into N high-order modulated signals; and transmitting the N high-order modulated signals on N subcarriers, where the N subcarriers are subcarriers on frequency domain resources of M channels, an $n^{th}$ high-order modulated signal in the N high-order modulated signals is transmitted on an $n^{th}$ subcarrier in the N subcarriers, N is an integer greater than or equal to 2, M is an integer greater than or equal to 2, and n=1, 2, . . . , N.

In this embodiment of this application, the plurality of low-order modulated signals are to-be-sent signals. The plurality of low-order modulated signals are combined into the N high-order modulated signals; and the N high-order modulated signals are transmitted on the N subcarriers, where the N subcarriers are the subcarriers on the frequency domain resources of the M channels. This can improve efficiency of a diversity gain.

Optionally, the combining a plurality of low-order modulated signals into N high-order modulated signals includes:

determining the N high-order modulated signals based on the plurality of low-order modulated signals and a channel matrix Q.

Herein, a high-order modulated signal may be split into a combination of a plurality of low-order modulated signals. For example, the high-order modulated signal may be obtained by multiplying the channel matrix Q by a column vector including the plurality of low-order modulated signals.

With reference to the first aspect, in a first possible implementation, the transmitting the N high-order modulated signals on N subcarriers includes:

transmitting k of the N high-order modulated signals on k subcarriers of an $m^{th}$ channel in the M channels, where N=M×k, k is an integer greater than 2, and m=1, 2, . . . , M.

Herein, a plurality of high-order modulated signals may be transmitted on a plurality of subcarriers of a plurality of channels. For example, k high-order modulated signals in the plurality of high-order modulated signals are transmitted on the k subcarriers of the $m^{th}$ channel in the M channels, thereby effectively implementing a diversity gain. N=M×k, k is an integer greater than 2, and m=1, 2, . . . , M.

With reference to the first aspect or the first possible implementation of the first aspect, in a second possible implementation, when M=2 and N=4, the M channels are a first channel and a second channel, the N subcarriers are a first subcarrier, a second subcarrier, a third siibcarrier, and a fourth subcarrier, and the N high-order modulated signals are a first high-order modulated signal $x_1$, a second high-order modulated signal $x_2$, a third high-order modulated signal $x_3$, and a fourth high-order modulated signal $x_4$; and the transmitting the N high-order modulated signals on N subcarriers includes:

transmitting the first high-order modulated signal $x_1$ on the first subcarrier of the first channel;

transmitting the second high-order modulated signal $x_2$ on the second subcarrier of the second channel;

transmitting the third high-order modulated signal $x_3$ on the third subcarrier of the first channel; and transmitting the fourth high-order modulated signal $x_4$ on the fourth subcarrier of the second channel.

Optionally, the plurality of low-order modulated signals are $s_1$, $s_2$, $s_3$, and $s_4$, and the channel matrix Q is any one of the following:

$$Q = \frac{1}{\sqrt{2}}\begin{bmatrix} 1 & j & 0 & 0 \\ 0 & 0 & 1 & j \\ 0 & 0 & 1 & -j \\ 1 & -j & 0 & 0 \end{bmatrix}, Q = \frac{1}{\sqrt{10}}\begin{bmatrix} 1 & j & 2 & 2j \\ 1 & j & 2 & 2j \\ -2 & -2j & 1 & j \\ -2 & -2j & 1 & j \end{bmatrix},$$

$$Q = \frac{1}{\sqrt{5}}\begin{bmatrix} 1 & 2 & 0 & 0 \\ 0 & 0 & 1 & 2 \\ 0 & 0 & -2 & 1 \\ -2 & 1 & 0 & 0 \end{bmatrix}, \text{ and } Q = \frac{1}{\sqrt{85}}\begin{bmatrix} 8 & 4 & 2 & 1 \\ 1 & 8 & 4 & 2 \\ 2 & 1 & 8 & 4 \\ 4 & 2 & 1 & 8 \end{bmatrix}.$$

With reference to the first aspect or the first possible implementation of the first aspect, in a third possible implementation, when M=3 and N=9, the M channels are a first channel, a second channel, and a third channel, the N subcarriers are a first subcarrier, a second subcarrier, a third subcarrier, a fourth subcarrier, a fifth subcarrier, a sixth subcarrier, a seventh subcarrier, an eighth subcarrier, and a ninth subcarrier, and the N high-order modulated signals are a first high-order modulated signal $x_1$, a second high-order modulated signal $x_2$, a third high-order modulated signal $x_3$, a fourth high-order modulated signal $x_4$, a fifth high-order modulated signal $x_5$, a sixth high-order modulated signal $x_6$, a seventh high-order modulated signal $x_7$, an eighth high-order modulated signal $x_8$, and a ninth high-order modulated signal $x_9$; and the transmitting the N high-order modulated signals on N subcarriers includes:

transmitting the first high-order modulated signal $x_1$ on the first subcarrier of the first channel;

transmitting the second high-order modulated signal $x_2$ on the second subcarrier of the second channel;

transmitting the third high-order modulated signal $x_3$ on the third subcarrier of the third channel;

transmitting the fourth high-order modulated signal $x_4$ on the fourth subcarrier of the first channel;

transmitting the fifth high-order modulated signal $x_5$ on the fifth subcarrier of the second channel;

transmitting the sixth high-order modulated signal $x_6$ on the sixth subcarrier of the third channel;

transmitting the seventh high-order modulated signal $x_7$ on the seventh subcarrier of the first channel;

transmitting the eighth high-order modulated signal $x_8$ on the eighth subcarrier of the second channel; and transmitting the ninth high-order modulated signal $x_9$ on the ninth subcarrier of the third channel.

Optionally, the plurality of low-order modulated signals are $s_1, s_2, s_3, s_4, s_5, s_6, s_7, s_8$, and $s_9$, and the channel matrix Q is:

$$Q = \frac{1}{\sqrt{21}}\begin{bmatrix} 4 & 2 & 1 & 0 & 0 & 0 & 0 & 0 & 0 \\ 0 & 0 & 0 & 4 & 2 & 1 & 0 & 0 & 0 \\ 0 & 0 & 0 & 0 & 0 & 0 & 4 & 2 & 1 \\ 0 & 0 & 0 & 0 & 0 & 0 & 1 & 4 & 2 \\ 1 & 4 & 2 & 0 & 0 & 0 & 0 & 0 & 0 \\ 0 & 0 & 0 & 1 & 4 & 2 & 0 & 0 & 0 \\ 0 & 0 & 0 & 2 & 1 & 4 & 0 & 0 & 0 \\ 0 & 0 & 0 & 0 & 0 & 0 & 2 & 1 & 4 \\ 2 & 1 & 4 & 0 & 0 & 0 & 0 & 0 & 0 \end{bmatrix}.$$

With reference to the first aspect, in a fourth possible implementation, the transmitting the N high-order modulated signals on N subcarriers includes:

transmitting the N high-order modulated signals on the N subcarriers of N subbands, where the $n^{th}$ subcarrier in the N subcarriers is a subcarrier of an $n^{th}$ subband in the N subbands, and the N subbands are subbands on the frequency domain resources of the M channels.

Herein, a plurality of high-order modulated signals may be transmitted on a plurality of subcarriers of a plurality of subbands. The plurality of subbands are obtained through division based on a frequency domain resource of a wideband channel.

With reference to the fourth possible implementation of the first aspect, in a fifth possible implementation, when N=4, the N subbands are a first subband, a second subband, a third subband, and a fourth subband, the N subcarriers are a first subcarrier, a second subcarrier, a third subcarrier, and a fourth subcarrier, the N high-order modulated signals are a first high-order modulated signal $x_1=\alpha_1 s_1+\beta_1 s_2$, a second high-order modulated signal $x_2=\alpha_2 s_2+\beta_2 s_2$, a third high-order modulated signal $x_1^*=(\alpha_1 s_1+\beta_1 s_2)^*$, and a fourth high-order modulated signal $x_2^*=(\alpha_2 s_1+\beta_2 s_2)^*$, $x_1^*$ is a conjugate of $x_1$, and $x_2^*$ is a conjugate of $x_2$; and the transmitting the N high-order modulated signals on the N subcarriers of N subbands includes:

transmitting the first high-order modulated signal $x_1=\alpha_1 s_1+\beta_1 s_2$ on the first subcarrier of the first subband;

transmitting the second high-order modulated signal $x_2=\alpha_2 s_1+\beta_2 s_2$ on the second subcarrier of the second subband;

transmitting the third high-order modulated signal $x_1^*=(\alpha_1 s_1+\beta_1 s_2)^*$ on the third subcarrier of the third subband; and transmitting the fourth high-order modulated signal $x_2^*=(\alpha_2 s_1+\beta_2 s_2)^*$ on the fourth subcarrier of the fourth subband.

Optionally, the plurality of low-order modulated signals are $s_1$ and $s_2$; and the channel matrix Q is $$Q = \begin{bmatrix} \alpha_1 & \beta_1 \\ \alpha_2 & \beta_2 \end{bmatrix},$$

where $$\alpha_1 = \frac{1}{\sqrt{2}}, \beta_1 = \frac{1}{\sqrt{2}}j, \alpha_2 = \frac{1}{\sqrt{2}}, \text{ and } \beta_2 = -\frac{1}{\sqrt{2}}j,$$

or the channel matrix Q is $$Q = \begin{bmatrix} \alpha_1 & \beta_1 \\ \alpha_2 & \beta_2 \end{bmatrix},$$

where $$\alpha_1 = \frac{1}{\sqrt{5}}, \beta_1 = \frac{2}{\sqrt{5}}, \alpha_2 = -\frac{2}{\sqrt{5}}, \text{ and } \beta_2 = \frac{1}{\sqrt{5}}.$$

With reference to the fourth possible implementation of the first aspect, in a sixth possible implementation, when N=3, the N subbands are a first subband, a second subband, and a third subband, the N subcarriers are a first subcarrier, a second subcarrier, and a third subcarrier, and the N high-order modulated signals are a first high-order modulated signal $x_1=\alpha_1 s_1+\beta_1 s_2+\gamma_1 s_3$, a second high-order modulated signal $x_2=\alpha_2 s_1+\beta_2 s_2+\gamma_2 s_3$, and a third high-order modulated signal $x_3=\alpha_3 s_1+\beta_3 s_2+\gamma_3 s_3$; and the transmitting the N high-order modulated signals on the N subcarriers of N subbands includes:

transmitting the first high-order modulated signal $x_1=\alpha_1 s_1+\beta_1 s_2+\gamma_1 s_3$ on the first subcarrier of the first subband;

transmitting the second high-order modulated signal $x_2=\alpha_2 s_1+\beta_2 s_2+\gamma_2 s_3$ on the second subcarrier of the second subband; and transmitting the third high-order modulated signal $x_3\alpha_3 s_1+\beta_3 s_2+\gamma_3 s_3$ on the third subcarrier of the third subband.

Optionally, the plurality of low-order modulated signals are $s_1, s_2$, and $s_3$; and the channel matrix Q is $$Q = \begin{bmatrix} \alpha_1 & \beta_1 & \gamma_1 \\ \alpha_2 & \beta_2 & \gamma_2 \\ \alpha_3 & \beta_3 & \gamma_3 \end{bmatrix},$$

where $$\alpha_1 = \frac{4}{\sqrt{21}}, \beta_1 = \frac{2}{\sqrt{21}}, \gamma_1 = \frac{1}{\sqrt{21}}, \alpha_2 = \frac{1}{\sqrt{21}}, \beta_2 = \frac{4}{\sqrt{21}},$$
$$\gamma_2 = \frac{2}{\sqrt{21}}, \text{ and } \alpha_3 = \frac{2}{\sqrt{21}}, \beta_2 = \frac{1}{\sqrt{21}}, \gamma_3 = \frac{4}{\sqrt{21}}.$$

According to a second aspect, a signal transmission apparatus is provided. The apparatus is configured to perform the method in the first aspect or any possible implementation of the first aspect. For example, the apparatus includes units configured to perform the method in the first aspect or any possible implementation of the first aspect.

According to a third aspect, a signal transmission apparatus is provided. The apparatus includes a receiver, a transmitter, a memory, a processor, and a bus system. The receiver, the transmitter, the memory, and the processor are connected by using the bus system. The memory is configured to store an instruction. The processor is configured to execute the instruction stored in the memory, to control the receiver to receive a signal and control the transmitter to send a signal. In addition, when the processor executes the instruction stored in the memory, the processor is enabled to perform the method in the first aspect or any possible implementation of the first aspect.

According to a fourth aspect, a computer-readable medium is provided. The computer-readable medium is configured to store a computer program. The computer program includes an instruction used to perform the method in the first aspect or any possible implementation of the first aspect.

BRIEF DESCRIPTION OF DRAWINGS

FIG. 10 is a schematic diagram of an example of two-channel aggregation according to an embodiment of this application;

FIG. 11 is a schematic diagram of another example of two-channel aggregation according to an embodiment of this application;

FIG. 12 is a schematic diagram of another example of two-channel aggregation according to an embodiment of this application;

FIG. 13 is a schematic diagram of another example of two-channel aggregation according to an embodiment of this application;

FIG. 14 is a schematic diagram of another example of two-channel aggregation according to an embodiment of this application;

FIG. 15 is a schematic diagram of still another example of two-channel aggregation according to an embodiment of this application;

FIG. 16 is a schematic diagram of an example of three-channel aggregation according to an embodiment of this application;

FIG. 17 is a schematic diagram of another example of three-channel aggregation according to an embodiment of this application;

DESCRIPTION OF EMBODIMENTS

The following clearly describes technical solutions in embodiments of this application with reference to accompanying drawings.

It should be understood that the technical solutions in embodiments of this application may be applied to various communications systems, for example, a Global System for Mobile Communications (GSM), a Code Division Multiple Access (CDMA) system, a Wideband Code Division Multiple Access (WCDMA) system, a general packet radio service (GPRS), a Long Term Evolution (LTE) system, an LIE frequency division duplex (FDD) system, an LTE time division duplex (TDD) system, and a Universal Mobile Telecommunications System (UNITS).

Figure 1:
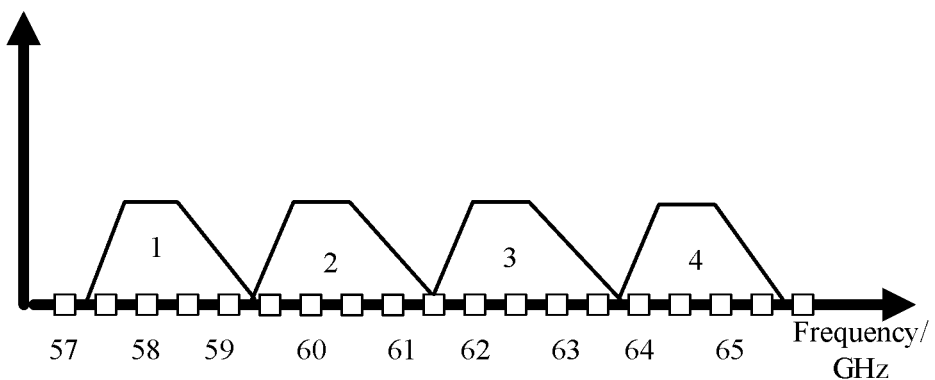
FIG. 1 is a schematic diagram of channel division according to an embodiment of this application.

It should be noted that, as shown in FIG. 1, channels in embodiments of this application are four channels obtained by dividing a free-of-charge 60 GHz frequency band, and are corresponding to sequence numbers 1, 2, 3, and 4 in FIG. 1. The four channels each have a bandwidth of 2.16 GHz, and central frequencies corresponding to the four channels are respectively 58.320 GHz, 60.480 GHz, 62.640 GHz, and 64.800 GHz.

Figure 2:
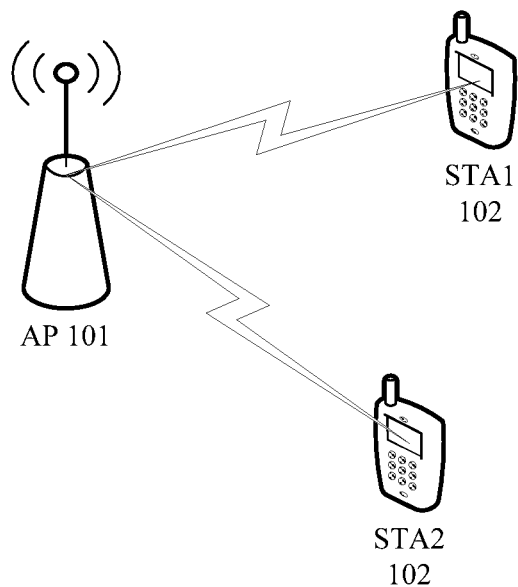
FIG. 2 is a schematic diagram of an application scenario according to an embodiment of this application.

FIG. 2 is a schematic diagram of an application scenario. Technical solutions in embodiments of this application may be applied to communication between an access point (AP) and a station (STA) in a Wireless Fidelity (Wi-Fi) network. As shown in FIG. 2, a STA1 102 and a STA2 102 are connected to an AP 101. The AP 101 may communicate with the STAs 102 by using a wireless signal. Usually, a wireless signal used for communication is sent and received by using a particular modulation scheme, and modulation schemes are classified into two types: single-carrier modulation and multi-carrier modulation.

It should be understood that embodiments of this application are described by using the application scenario in FIG. 2 as an example. However, this application is not limited thereto. For example, in FIG. 2, the STA1 102 and the STA2 102 are used as examples for description, and the system may further include more STAs.

It should be further understood that the STA in FIG. 2 may be a terminal, a mobile station (MS), a mobile terminal, or the like, for example, may be a notebook computer or a mobile phone device. The terminal may communicate with one or more core networks via a radio access network (RAN). For example, the terminal may be a mobile phone (or referred to as a "cellular" phone) or a computer having a mobile terminal. For example, the terminal may alternatively be a portable, pocket-sized, handheld, computer built-in, or in-vehicle mobile apparatus, which exchanges voice and/or data with the radio access network. The AP in FIG. 2 is configured to provide communication between the STA and a network, and is an access point at which the terminal accesses the network.

Embodiments of this application are described by using an AP and a STA in a WLAN system as examples, but this application is not limited thereto. A method and an apparatus according to embodiments of this application may also be applied to a base station and user equipment in another communications system. Similarly, it should be further understood that embodiments of this application are described by using the WLAN system as an example, but this application is not limited thereto. The method and the apparatus according to embodiments of this application may also be applied to another communications system.

In current Wi-Fi technologies, one of solutions for implementing the Institute of Electrical and Electronics Engineers (IEEE) 802.11ad technology is an orthogonal frequency division multiplexing (OFDM) system. Technical solutions in embodiments of this application may be applied to the OFDM system. OFDM is a multi-carrier modulation scheme, and overcomes frequency selective fading of a channel by reducing and eliminating impact of intercede interference. Modulation schemes supported by OFDM include staggered quadriphase shift keying (SQPSK), quadrature phase shift, keying (QPSK), 16 quadrature amplitude modulation (QAM), and 32QAM. A dual carrier modulation (DCM) method is used for SQPSK and QPSK.

DCM is a method for improving sending performance by using a frequency diversity. For example, for two to-be-sent signals $s_1$, $s_2$, signals $x_1=\alpha_1 s_1+\beta_1 s_2$ and $x_2=\alpha_2 s_1+\beta_2 s_2$ that are generated by combining the two signals are sent at different frequencies (carriers) at the same time. For example, the signals $x_1$, $x_2$ are respectively sent at a frequency $f_1$ and a frequency $f_2$, to achieve an effect of the frequency diversity. $s_1$, $s_2$ may be expressed as $$\begin{bmatrix} x_1 \\ x_2 \end{bmatrix} = \begin{bmatrix} \alpha_1 & \beta_1 \\ \alpha_2 & \beta_2 \end{bmatrix} \begin{bmatrix} s_1 \\ s_2 \end{bmatrix},$$

where $$Q = \begin{bmatrix} \alpha_1 & \beta_1 \\ \alpha_2 & \beta_2 \end{bmatrix}.$$

Herein, DCM requires that the signals $s_1$, $s_2$ and $x_1$, $x_2$ be dots in a typical constellation diagram. For example, in a typical implementation, when $s_1$, $s_2$ are QPSK signals, Q and $s_1$, $s_2$ are multiplied, so that two 16QAM signals $x_1$, $x_2$ can be generated, where $$Q = \frac{1}{\sqrt{5}} \begin{bmatrix} 1 & 2 \\ 2 & -1 \end{bmatrix}.$$

However, in the existing 802.11ad standard, only one channel can be used at a time for signal transmission. Consequently, a transmission throughput is relatively low, and more diversities cannot be flexibly implemented. Therefore, this application provides a solution in which signals are transmitted on a plurality of subcarriers of a plurality of channels. A core idea of signal transmission in this application is: A plurality of channels and a plurality of subcarriers are combined to transmit signals on the plurality of channels. This can improve efficiency of a diversity gain.

In embodiments of this application, when signals are transmitted on a plurality of channels, related content of "splitting a high-order modulated signal into a combination of a plurality of low-order modulated signals" is included. The following first describes in detail the related content of that the high-order modulated signal may be split into the combination of the plurality of low-order modulated signals. For ease of description, the following uses x to indicate a high-order modulated signal and uses s to indicate a low-order modulated signal. The high-order modulated signal and the low-order modulated signal may be expressed in a form of a matrix. The following cases are for example included:

(1) QPSK=binary phase shift keying (BPSK)+BPSK

When the high-order modulated signal is a QPSK signal, the QPSK signal x may be split into a combination of two low-order modulated signals, namely, BPSK signals. Values of the QPSK signal x may be:

$$\frac{1}{\sqrt{2}}\{1+j, 1-j, -1+j, -1-j\}$$

Figure 3:
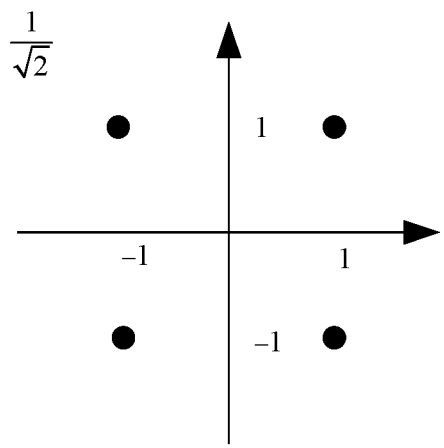
FIG. 3 is a schematic diagram of a constellation diagram of quadrature phase shift keying.

For example, FIG. 3 is a schematic diagram of a constellation diagram of QPSK. As shown in FIG. 3, four black dots in the figure are corresponding to the values of the QPSK signal x.

For example, x may be split into the combination of the two BPSK signals $s_1$, $s_2$, and is expressed as $$x = \frac{1}{\sqrt{2}}(\alpha_1 s_1 + \alpha_2 s_2).$$

Values of $s_1$ include $\{1, -1\}$, and values of $s_2$ include $\{1, -1\}$. There are two combination manners for $\alpha_1$, $\alpha_2$. Table 1 shows combination coefficients of $\alpha_1$, $\alpha_2$.

TABLE 1

| Combination coefficients in QPSK = BPSK + BPSK | | |
|---|---|---|
| | $\alpha_1$ | $\alpha_2$ |
| Combination 1 | 1 | j |
| Combination 2 | 1 | −j |

(2) 16QAM=QPSK+QPSK

When the high-order modulated signal is a 16QAM signal, the 16QAM signal x may be split into a combination of two low-order modulated signals, namely, QPSK signals. Values of the 16QAM signal x may be:

$$\frac{1}{\sqrt{10}}\{1+j, 1+3j, 3+j, 3+3j, 1-j, 1-3j, 3-j, 3-3j, -1+j,$$

$$-1+3j, -3+j, -3+3j, -1-j, -1-3j, -3-j, -3-3j\}$$

Figure 4:
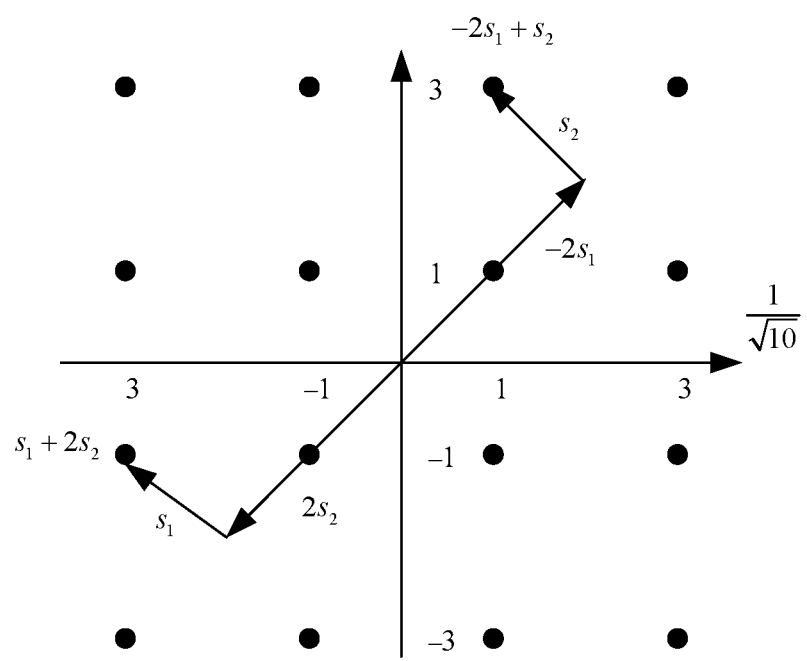
FIG. 4 is a schematic diagram of a constellation diagram of 16 quadrature amplitude modulation.

For example, FIG. 4 is a schematic diagram of a constellation diagram of 16QAM. As shown in FIG. 4, 16 black dots in the figure are corresponding to the values of the 16QAM signal x.

For example, x is split into the combination of the two QPSK signals $s_1$, $s_2$, and may be expressed as $$x = \frac{1}{\sqrt{5}}(\alpha_1 s_1 + \alpha_2 s_2)$$

Values of $s_1$ include $$\frac{1}{\sqrt{2}}\{1+j, 1-j, -1+j, -1-j\},$$

and values of $s_2$ include $$\frac{1}{\sqrt{2}}\{1+j, 1-j, -1+j, -1-j\}.$$

There are four combination manners for $\alpha_1$, $\alpha_2$. Table 2 shows combination coefficients of $\alpha_1$, $\alpha_2$.

TABLE 2

| Combination coefficients in 16QAM = QPSK + QPSK | | |
|---|---|---|
| | $\alpha_1$ | $\alpha_2$ |
| Combination 1 | 1 | 2 |
| Combination 2 | 1 | −2 |
| Combination 3 | 2 | 1 |
| Combination 4 | 2 | −1 |

$\alpha_1$, $\alpha_2$ are substituted into the expression of x based on the foregoing four manners of $\alpha_1$, $\alpha_2$,
and $$x = \frac{1}{\sqrt{5}}(s_1 + 2s_2), x = \frac{1}{\sqrt{5}}(s_1 - 2s_2), x = \frac{1}{\sqrt{5}}(2s_1 + s_2),$$

and $$x = \frac{1}{\sqrt{5}}(2s_1 - s_2)$$

may be correspondingly obtained.

(3) 64QAM=QPSK+QPSK+QPSK

When the high-order modulated signal is a 64QAM signal, the 64QAM signal x may be split into a combination of three low-order modulated signals, namely, QPSK signals. Values of the 64QAM signal x may be:

$$\frac{1}{\sqrt{42}}$$

$\{1+j, 1+3j, 1+5j, 1+7j, \ldots, -7-j, -7-3j, -7-5j, -7-7j\}$

Figure 5:
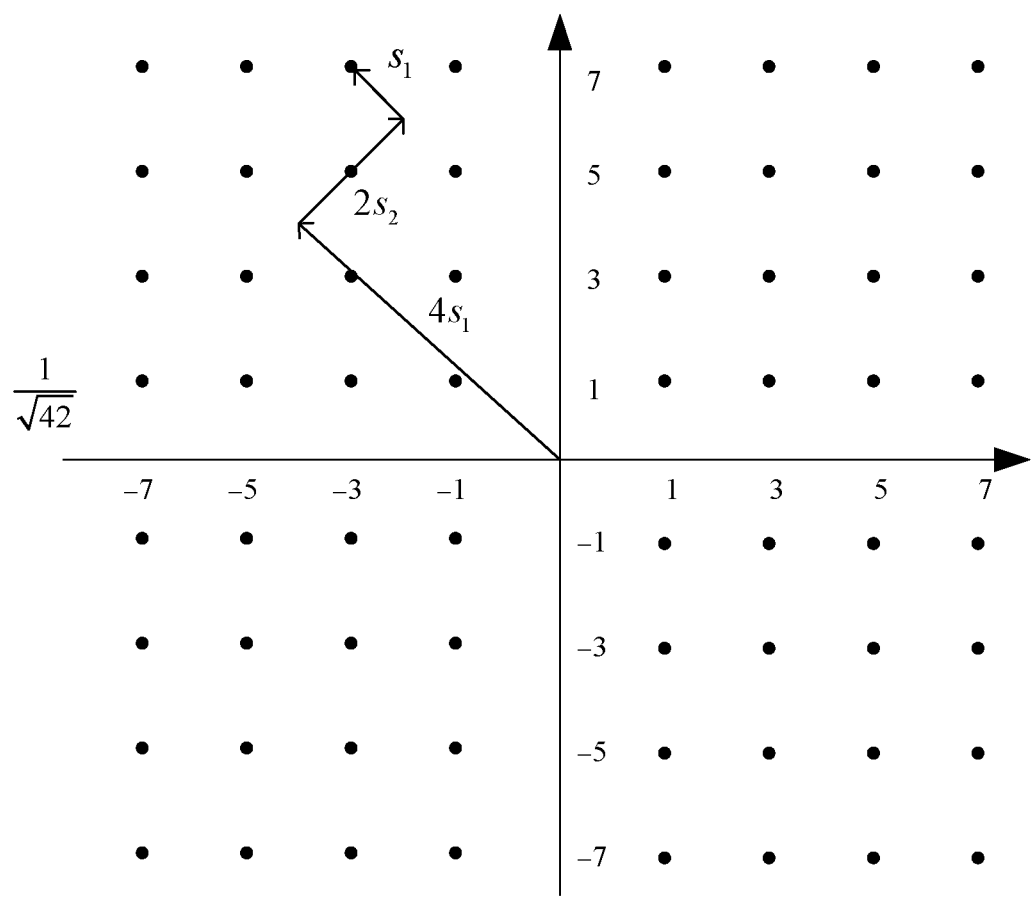
FIG. 5 is a schematic diagram of a constellation diagram of 64 quadrature amplitude modulation.

For example, FIG. 5 is a schematic diagram of a constellation diagram of 64QAM. As shown in FIG. 5, 64 black dots in the figure are corresponding to the values of the 64QAM signal x.

For example, x is split into the combination of the three QPSK signals $s_1$, $s_2$, and $s_3$, and may be expressed as $$x = \frac{1}{\sqrt{21}}(\alpha_1 s_1 + \alpha_2 s_2 + \alpha_3 s_3).$$

Values of $s_1$ include $$\frac{1}{\sqrt{2}}\{1+j, 1-j, -1+j, -1-j\},$$

values of $s_2$ include $$\frac{1}{\sqrt{21}}\{1+j, 1-j, -1+j, -1-j\},$$

and values of $s_3$ include $$\frac{1}{\sqrt{2}}\{1+j, 1-j, -1+j, -1-j\}.$$

There are a plurality of combination manners for $\alpha_1$, $\alpha_2$, $\alpha_3$, and 24 combination manners are listed herein. Table 3 shows combination coefficients of $\alpha_1$, $\alpha_2$, $\alpha_3$.

TABLE 3

| Combination coefficients of $\alpha_1$, $\alpha_2$, $\alpha_3$ in 64QAM = QPSK + QPSK + QPSK | | |
|---|---|---|
| Baseline combination $\alpha_1, \alpha_2, \alpha_3$ | Cyclically shifted by one bit $\alpha_1, \alpha_2, \alpha_3$ | Cyclically shifted by two bits $\alpha_1, \alpha_2, \alpha_3$ |
| (4, 2, 1) | (1, 4, 2) | (2, 1, 4) |
| (4, 2, −1) | (−1, 4, 2) | (2, −1, 4) |
| (4, −2, 1) | (1, 4, −2) | (−2, 1, 4) |
| (4, −2, −1) | (−1, 4, −2) | (−2, −1, 4) |
| (−4, 2, 1) | (1, −4, 2) | (2, 1, −4) |
| (−4, 2, −1) | (−1, −4, 2) | (2, −1, −4) |
| (−4, −2, 1) | (1, −4, −2) | (−2, 1, −4) |
| (−4, −2, −1) | (−1, −4, −2) | (−2, −1, −4) |

The foregoing 24 combinations are generated in the following manner:

First, eight baseline combinations are generated for x based on the Baseline combination coefficients of $\alpha_1$, $\alpha_2$, $\alpha_3$ in Table 3, in other words, $$x = \frac{1}{\sqrt{21}}(\pm 4s_1 \pm 2s_2 \pm 1s_3).$$

Values of the eight baseline combinations of x are:

$$x = \frac{1}{\sqrt{21}}(4s_1 + 2s_2 + s_3),$$

$$x = \frac{1}{\sqrt{21}}(4s_1 + 2s_2 - s_3),$$

$$x = \frac{1}{\sqrt{21}}(4s_1 - 2s_2 + s_3),$$

$$x = \frac{1}{\sqrt{21}}(4s_1 - 2s_2 - s_3),$$

$$x = \frac{1}{\sqrt{21}}(-4s_1 + 2s_2 + s_3),$$

$$x = \frac{1}{\sqrt{21}}(-4s_1 + 2s_2 - s_3),$$

$$x = \frac{1}{\sqrt{21}}(-4s_1 - 2s_2 + s_3), \text{ and}$$

$$x = \frac{1}{\sqrt{21}}(-4s_1 - 2s_2 - s_3).$$

Then, two cyclic shifts are performed on each of the eight baseline combinations, and eight groups of values are generated after each shift For $$x = \frac{1}{\sqrt{21}}(4s_1 + 2s_2 + s_3),$$

$$x = \frac{1}{\sqrt{21}}(s_1 + 4s_2 + 2s_3)$$

is obtained after the Cyclically shifted by one bit, and $$x = \frac{1}{\sqrt{21}}(2s_1 + s_2 + 4s_3)$$

is obtained after the Cyclically shifted by two bits. Other values obtained after x is cyclically shifted are similar, and details are not described.

(4) 64QAM=QPSK+16QAM

When the high-order modulated signal is a 64QAM signal, the 64QAM signal may alternatively be split into a combination of one low-order modulated signal, namely, QPSK signal, and one 16QAM signal. Values of the 64QAM signal may be:

$$\frac{1}{\sqrt{42}}$$

$$\{1+j, 1+3j, 1+5j, 1+7j, \ldots, -7-j, -7-3j, -7-5j, -7-7j\}$$

Figure 6:
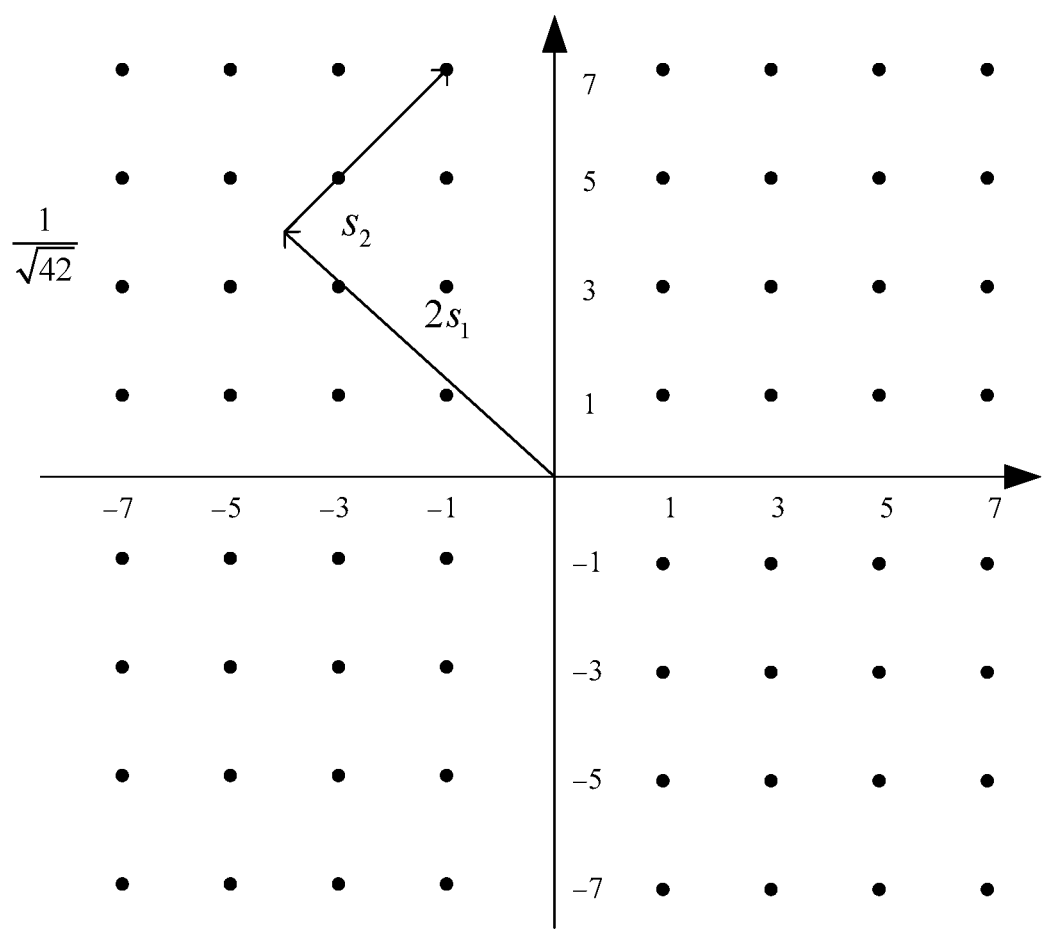
FIG. 6 is another schematic diagram of a constellation diagram of 64 quadrature amplitude modulation.

For example, FIG. 6 is another schematic diagram of a constellation diagram of 64QAM. As shown in FIG. 6, 64 black dots in the figure are corresponding to the values of the 64QAM signal x.

For example, x is split into the combination of the one QPSK signal $s_1$ and the one 16QAM signal $s_2$, and may be expressed as $$x = \frac{1}{\sqrt{5}}(\alpha_1 s_1 + \alpha_2 s_2).$$

Values of $s_1$ include $$\frac{1}{\sqrt{2}}\{1+j, 1-j, -1+j, -1-j\},$$

and values of $s_2$ include $$\frac{1}{\sqrt{2}}\{1+j, 1-j, -1+j, -1-j\}.$$

There are four combination manners for $\alpha_1$, $\alpha_2$. Table 4 shows combination coefficients of $\alpha_1$, $\alpha_2$.

TABLE 4

| Combination coefficients of $\alpha_1$, $\alpha_2$ in 64QAM = QPSK + 16QAM | | |
|---|---|---|
| | $\alpha_1$ | $\alpha_2$ |
| Combination 1 | 1 | 2 |
| Combination 2 | 1 | -2 |
| Combination 3 | 2 | 1 |
| Combination 4 | 2 | -1 |

$\alpha_1$, $\alpha_2$ are substituted into the expression of x based on the foregoing four manners of $\alpha_1 \alpha_2$, and $$x = \frac{1}{\sqrt{5}}(s_1 + 2s_2),$$

$$x = \frac{1}{\sqrt{5}}(s_1 - s2_2),$$

$$x = \frac{1}{\sqrt{5}}(2s_1 + s_2), \text{ and}$$

$$x = \frac{1}{\sqrt{5}}(2s_1 - s_2)$$

may be correspondingly obtained.

(5) 256QAM=QPSK+QPSK+QPSK+QPSK

When the high-order modulated signal is a 256QAM signal, the 256QAM signal X may alternatively be split into a combination of four QPSK signals. Values of the 256QAM signal x may be:

$$\frac{1}{\sqrt{170}}\{1+j, 1+3j, 1+5j, 1+7j, 1+9j, 1+11j,$$

$$1+13j, 1+15j, \ldots, -15-j, -15-3j, -15-5j,$$

$$-15-7j, -15-9j, -15-11j, -15-13j, -15-15j\}$$

Figure 7:
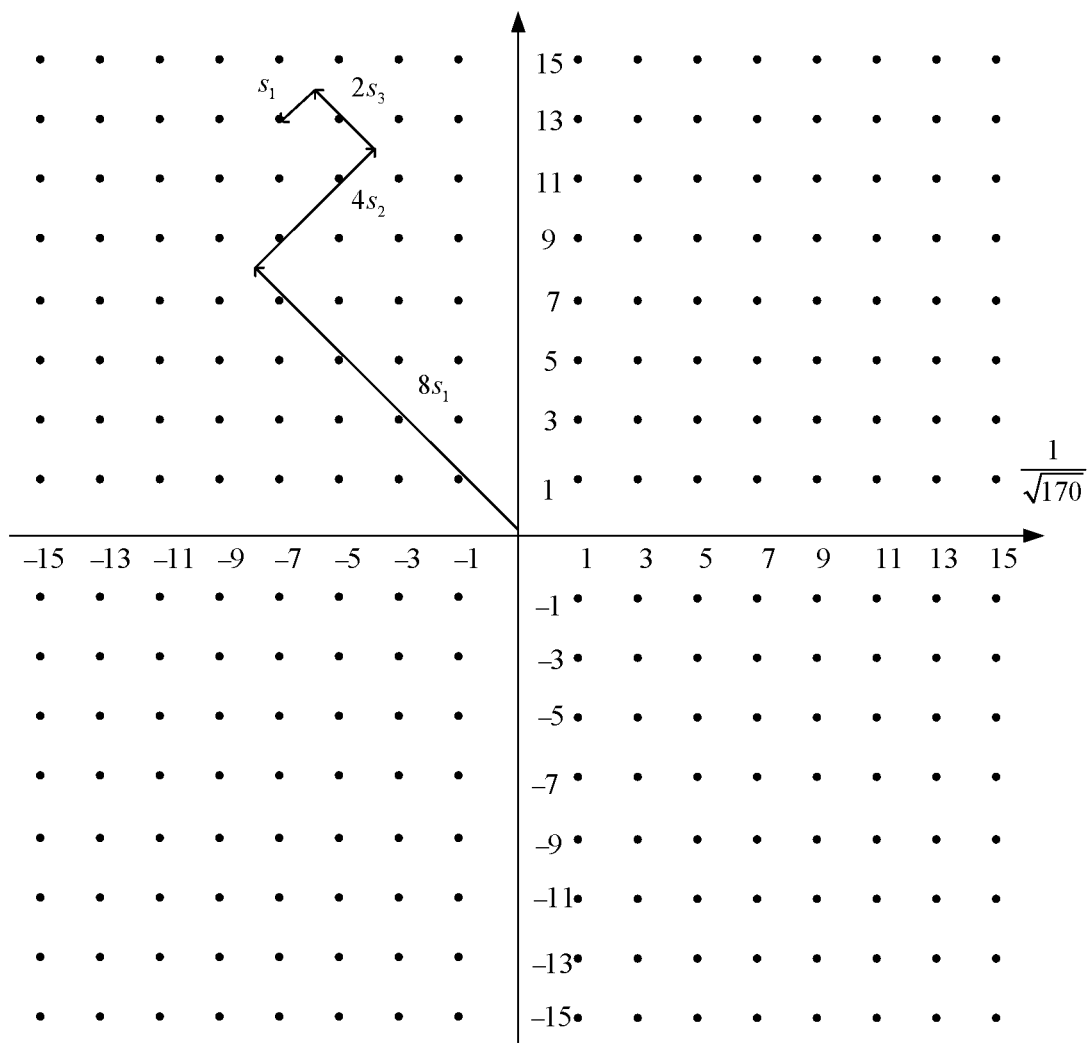
FIG. 7 is a schematic diagram of a constellation diagram of 256 quadrature amplitude modulation.

For example, FIG. 7 is a schematic diagram of a constellation diagram of 256QAM. As shown in FIG. 7, 256 black dots in the figure are corresponding to the values of the 256QAM signal x.

For example, is split into the combination of the four QPSK signals $s_1$, $s_2$, $s_3$, $s_4$, and may be expressed as $$x = \frac{1}{\sqrt{85}}(\alpha_1 s_1 + \alpha_2 s_2 + \alpha_3 s_3 + \alpha_4 s_4).$$

Values of $s_1$ include $$\frac{1}{\sqrt{2}}\{1+j, 1-j, -1+j, -1-j\},$$

values of $s_2$ include $$\frac{1}{\sqrt{2}}\{1+j, 1-j, -1+j, -1-j\},$$

values of $s_3$ include $$\frac{1}{\sqrt{2}}\{1+j, 1-j, -1+j, -1-j\},$$

and values of $s_4$ include $$\frac{1}{\sqrt{2}}\{1+j, 1-j, -1+j, -1-j\}.$$

There are a plurality of combination manners for $\alpha_1$, $\alpha_2$, $\alpha_3$, $\alpha_4$, and 64 combination manners are listed herein. Table 5 shows combination coefficients of $\alpha_1$, $\alpha_2$, $\alpha_3$, $\alpha_4$.

TABLE 5

Combination coefficients of $\alpha_1$, $\alpha_2$, $\alpha_3$, $\alpha_4$ in 256QAM = QPSK + QPSK + QPSK + QPSK

| Baseline combination $\alpha_1, \alpha_2, \alpha_3, \alpha_4$ | Cyclically shifted by one bit $\alpha_1, \alpha_2, \alpha_3, \alpha_4$ | Cyclically shifted by two bits $\alpha_1, \alpha_2, \alpha_3, \alpha_4$ | Cyclically shifted by three bits $\alpha_1, \alpha_2, \alpha_3, \alpha_4$ |
| --- | --- | --- | --- |
| (8, 4, 2, 1) | (1, 8, 4, 2) | (2, 1, 8, 4) | (4, 2, 1, 8) |
| (8, 4, 2, −1) | (−1, 8, 4, 2) | (2, −1, 8, 4) | (4, 2, −1, 8) |
| (8, 4, −2, 1) | (1, 8, 4, −2) | (−2, 1, 8, 4) | (4, −2, 1, 8) |
| (8, 4, −2, −1) | (−1, 8, 4, −2) | (−2, −1, 8, 4) | (4, −2, −1, 8) |
| (8, −4, 2, 1) | (1, 8, −4, 2) | (2, 1, 8, −4) | (−4, 2, 1, 8) |
| (8, −4, 2, −1) | (−1, 8, −4, 2) | (2, −1, 8, −4) | (−4, 2, −1, 8) |
| (8, −4, −2, 1) | (1, 8, −4, −2) | (−2, 1, 8, −4) | (−4, −2, 1, 8) |
| (8, −4, −2, −1) | (−1, 8, −4, −2) | (−2, −1, 8, −4) | (−4, −2, −1, 8) |
| (−8, 4, 2, 1) | (1, −8, 4, 2) | (2, 1, −8, 4) | (4, 2, 1, −8) |
| (−8, 4, 2, −1) | (−1, −8, 4, 2) | (2, −1, −8, 4) | (4, 2, −1, −8) |
| (−8, 4, −2, 1) | (1, −8, 4, −2) | (−2, 1, −8, 4) | (4, −2, 1, −8) |
| (−8, 4, −2, −1) | (−1, −8, 4, −2) | (−2, −1, −8, 4) | (4, −2, −1, −8) |
| (−8, −4, 2, 1) | (1, −8, −4, 2) | (2, 1, −8, −4) | (−4, 2, 1, −8) |
| (−8, −4, 2, −1) | (−1, −8, −4, 2) | (2, −1, −8, −4) | (−4, 2, −1, −8) |
| (−8, −4, −2, 1) | (1, −8, −4, −2) | (−2, 1, −8, −4) | (−4, −2, 1, −8) |
| (−8, −4, −2, −1) | (−1, −8, −4, −2) | (−2, −1, −8, −4) | (−4, −2, −1, −8) |

The foregoing 64 combinations are generated in the following manner:

First, 16 baseline combinations are generated for x based on the Baseline combination coefficients of $\alpha_1$, $\alpha_2$, $\alpha_3$, $\alpha_4$ in Table 5, in other words, $$x = \frac{1}{\sqrt{85}}(\pm 8s_1 \pm 4s_2 \pm 2s_3 + \pm s_4),$$

and are:

$$x = \frac{1}{\sqrt{85}}(8s_1 + 4s_2 + 2s_3 + s_4),$$

$$x = \frac{1}{\sqrt{85}}(8s_1 + 4s_2 - 2s_3 + s_4),$$

$$x = \frac{1}{\sqrt{85}}(8s_1 - 4s_2 + 2s_3 + s_4),$$

$$x = \frac{1}{\sqrt{85}}(8s_1 - 4s_2 - 2s_3 + s_4),$$

$$x = \frac{1}{\sqrt{85}}(-8s_1 + 4s_2 + 2s_3 + s_4),$$

$$x = \frac{1}{\sqrt{85}}(-8s_1 + 4s_2 - 2s_3 + s_4),$$

$$x = \frac{1}{\sqrt{85}}(-8s_1 - 4s_2 + 2s_3 + s_4),$$

$$x = \frac{1}{\sqrt{85}}(-8s_1 - 4s_2 - 2s_3 + s_4),$$

$$x = \frac{1}{\sqrt{85}}(8s_1 + 4s_2 + 2s_3 - s_4),$$

$$x = \frac{1}{\sqrt{85}}(8s_1 + 4s_2 - 2s_3 - s_4),$$

$$x = \frac{1}{\sqrt{85}}(8s_1 - 4s_2 + 2s_3 - s_4),$$

$$x = \frac{1}{\sqrt{85}}(8s_1 - 4s_2 - 2s_3 - s_4),$$

$$x = \frac{1}{\sqrt{85}}(-8s_1 + 4s_2 + 2s_3 - s_4),$$

$$x = \frac{1}{\sqrt{85}}(-8s_1 + 4s_2 - 2s_3 - s_4),$$

$$x = \frac{1}{\sqrt{85}}(-8s_1 - 4s_2 + 2s_3 - s_4), \text{ and}$$

$$x = \frac{1}{\sqrt{85}}(-8s_1 - 4s_2 - 2s_3 - s_4)$$

Then, three cyclic shifts are performed on each of the 16 baseline combinations, and 16 groups of values are generated after each shift.

For example, $$x = \frac{1}{\sqrt{85}}(1s_1 + 8s_2 + 4s_3 + 2s_4)$$

is obtained after $$x = \frac{1}{\sqrt{85}}(8s_1 + 4s_2 + 2s_3 + s_4)$$

is cyclically shifted by one bit, $$x = \frac{1}{\sqrt{85}}(2s_1 + s_2 + 8s_3 + 4s_4)$$

is obtained after $$x = \frac{1}{\sqrt{85}}(8s_1 + 4s_2 + 2s_3 + s_4)$$

is cyclically shifted by two bits, and $$x = \frac{1}{\sqrt{85}}(8s_1 + 4s_2 + 2s_3 + s_4)$$

is obtained after $$x = \frac{1}{\sqrt{85}}(4s_1 + 2s_2 + s_3 + 8s_4)$$

is cyclically shifted by three bits. Values obtained after other values of x are cyclically shifted are similar, and details are not described herein.

The foregoing lists a plurality of cases of splitting some high-order modulated signals into low-order modulated signals. It should be understood that there may be more forms of a combination, of low-order modulated signals, into which a high-order modulated signal is split. This is not limited.

Figure 8:
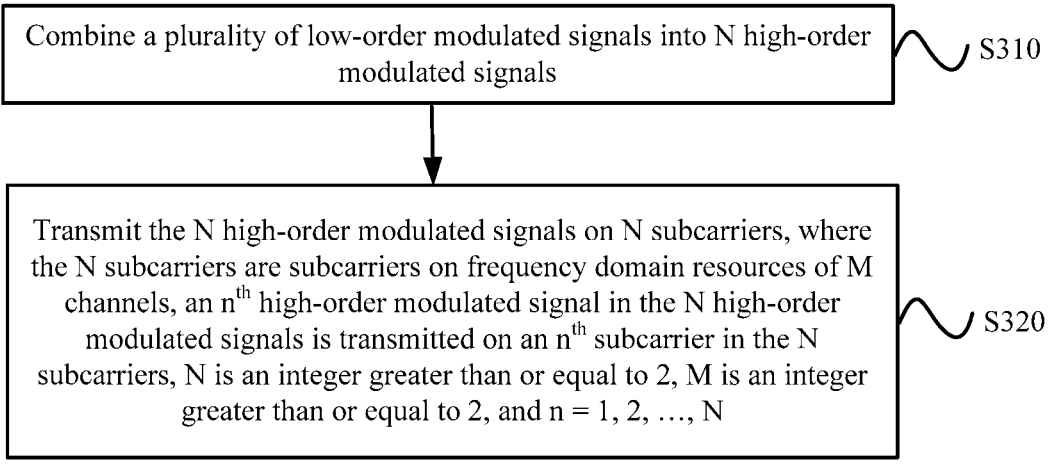
FIG. 8 is a schematic flowchart of a signal transmission method according to an embodiment of this application.

FIG. 8 is a schematic flowchart of a signal transmission method 300 according to an embodiment of this application. As shown in FIG. 8, the method 300 includes the following steps:

S310. Combine a plurality of low-order modulated signals into N high-order modulated signals.

S320. Transmit the N high-order modulated signals on N subcarriers, where the N subcarriers are subcarriers on frequency domain resources of M channels, an $n^{th}$ high-order modulated signal in the N high-order modulated signals is transmitted on an $n^{th}$ subcarrier in the N subcarriers, N is an integer greater than or equal to 2, M is an integer greater than or equal to 2, and n=1, 2, . . . , N.

For example, a signal transmission apparatus combines the plurality of low-order modulated signals into the N high-order modulated signals, and then transmits the N high-order modulated signals on the N subcarriers. The N subcarriers are subcarriers on frequency domain resources of a plurality of (for example, M) channels. The $n^{th}$ high-order modulated signal in the N high-order modulated signals is transmitted on the $n^{th}$ subcarrier in the N subcarriers, N is an integer greater than or equal to 2, M is an integer greater than or equal to 2, and n=1, 2, . . . , N.

In this embodiment of this application, to-be-sent signals are low-order modulated signals, the low-order modulated signals are combined into high-order modulated signals, and the to-be-sent low-order modulated signals are transmitted on a plurality of channels by using the high-order modulated signals.

In this embodiment of this application, a quantity of the plurality of low-order modulated signals may be N or may be N/2. This is not limited. For example, when two low-order modulated signals and their corresponding conjugate signals are transmitted on subcarriers, four corresponding high-order modulated signals are transmitted on four subcarriers.

In this embodiment of this application, that the N subcarriers are subcarriers on frequency domain resources of M channels includes the following cases: In a first case, the N subcarriers are subcarriers on a channel in the M channels. In a second case, the N subcarriers are subcarriers on a subband in N subbands, where the N subbands are subbands obtained by dividing a wideband channel by using a frequency domain resource.

In this embodiment of this application, both N and M are integers greater than or equal to 2. N is introduced to indicate a plurality of high-order modulated signals or indicate a plurality of subcarriers, and the $n^{th}$ high-order modulated signal is transmitted on the $n^{th}$ subcarrier. M is introduced to indicate a plurality of channels, and the N subcarriers are the subcarriers on the frequency domain resources of the M channels. A relationship between the quantity N of subcarriers and the quantity M of channels may be selected with reference to a specific situation. For example, there may be four subcarriers on two channels or nine subcarriers on three channels. This is not limited.

Therefore, in the signal transmission method in this embodiment of this application, the plurality of low-order modulated signals are combined into the N high-order modulated signals; and the N high-order modulated signals are transmitted on the N subcarriers, where the N subcarriers are the subcarriers on the frequency domain resources of the M channels. This can improve efficiency of a diversity gain.

Optionally, in this embodiment of this application, the combining a plurality of low-order modulated signals into N high-order modulated signals includes:

determining the N high-order modulated signals based on the plurality of low-order modulated signals and a channel matrix Q.

For example, when a plurality of high-order modulated signals of the plurality of low-order modulated signals are determined, a column vector including the plurality of low-order modulated signals may be multiplied by the channel matrix Q to obtain the N high-order modulated signals. For example, for a specific operation, refer to the foregoing plurality of cases of splitting a high-order modulated signal into low-order modulated signals. Details are not described herein again.

In this embodiment of this application, the plurality of subcarriers are subcarriers on a plurality of channels; or the plurality of subcarriers are subcarriers on a plurality of subbands, where the plurality of subbands are obtained through division based on a frequency domain resource of a wideband channel.

In the technical solution in this embodiment of this application, a channel aggregation solution or a wideband channel (wideband) solution may be used for transmission. Herein, that "the plurality of subcarriers are subcarriers on a plurality of channels" is corresponding to the "channel aggregation" solution, and that "the plurality of subcarriers are subcarriers on a plurality of subbands" is corresponding to the "wideband channel" solution.

The following describes in detail the technical solutions of this application in two application scenarios: a "channel aggregation" scenario or a "wideband channel" scenario.

Figure 9:
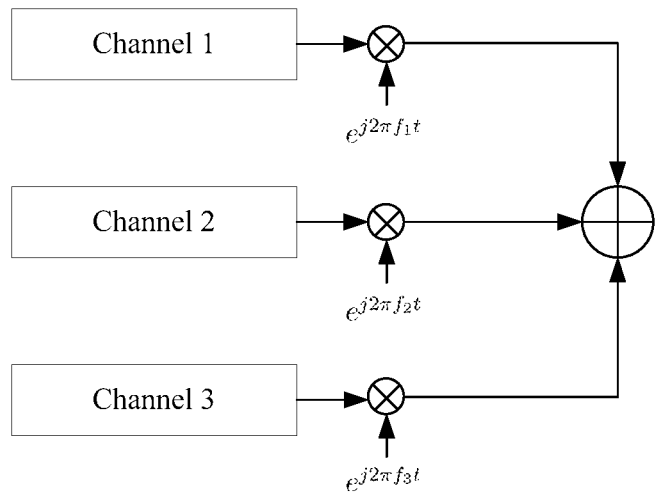
FIG. 9 is a schematic principle diagram of channel aggregation.

This embodiment of this application is first described in a plurality of cases of "channel aggregation". Before exemplary embodiments are described, an exemplary implementation principle of "channel aggregation" is first described with reference to FIG. 9. Herein, an example in which there are three channels is used for description. As shown in FIG. 9, data of a channel 1 undergoes coding and modulation and then is multiplied by a corresponding carrier frequency signal $e^{j2\pi f_1 t}$, data of a channel channel 2 undergoes coding and modulation and then is multiplied by a corresponding carrier frequency signal $e^{j2\pi f_2 t}$, data of a channel channel 3 undergoes coding and modulation and then is multiplied by a corresponding carrier frequency signal $e^{j2\pi f_1 t}$, and finally, data of the three channels are superposed and sent.

Optionally, in an embodiment, the transmitting the N high-order modulated signals on N subcarriers includes:

transmitting k of the N high-order modulated signals on k subcarriers of an $m^{th}$ channel in the M channels, where N=M×k, k is an integer greater than 2, and m=1, 2, ..., M.

For example, a plurality of high-order modulated signals may be transmitted on a plurality of subcarriers of each of a plurality of channels. For example, the k of the N high-order modulated signals are transmitted on the k subcarriers of the $m^{th}$ channel in the M channels. Herein, N=M×k, k is an integer greater than 2, and m=1, 2, ..., M. For example, when k=3 M=3, and N=9, three of nine high-order modulated signals are transmitted on three subcarriers of one channel (for example, the $m^{th}$ channel) in three channels (that is, when the three channels are aggregated, the nine high-order modulated signals are transmitted on nine subcarriers).

It should be understood that m and M are introduced herein to indicate one of a plurality of channels, but do not constitute a specific limitation on this application. Certainly, functions of other introduced letters are similar, for example, the k of the N high-order modulated signals. This is not limited.

In other words, high-order modulated signals are separately transmitted in different channels. In this way, a difference between this application and the prior art in which transmission is performed on only one channel is: A plurality of high-order modulated signals are transmitted on subcarriers of a plurality of channels, thereby improving efficiency of a frequency diversity gain. Herein, the frequency diversity gain is generated because a channel has frequency domain selective fading. If signals transmitted in one channel are dispersed into a plurality of channels and then the dispersed signals are rectified by using the channel matrix Q, signal accuracy is improved, and the frequency diversity gain is also implemented.

Therefore, in the signal transmission method in this embodiment of this application, the plurality of low-order modulated signals are combined into the N high-order modulated signals; and the N high-order modulated signals are transmitted on the N subcarriers, where the N subcarriers are the subcarriers on the frequency domain resources of the M channels. For example, the k of the N high-order modulated signals are transmitted on the subcarriers of the $m^{th}$ channel in the M channels. This can improve efficiency of a diversity gain.

Optionally, in an embodiment, when M=2 and N=4, the M channels are a first channel and a second channel, the N subcarriers area first subcarrier, a second subcarrier, a third subcarrier, and a fourth subcarrier, and the N high-order modulated signals are a first high-order modulated signal $x_1$, a second high-order modulated signal $x_2$, a third high-order modulated signal $x_3$, and a fourth high-order modulated signal $x_4$; and the transmitting the N high-order modulated signals on N subcarriers includes:

transmitting the first high-order modulated signal $x_1$ on the first subcarrier of the first channel;

transmitting the second high-order modulated signal $x_2$ on the second subcarrier of the second channel;

transmitting the third high-order modulated signal $x_3$ on the third subcarrier of the first channel; and transmitting the fourth high-order modulated signal $x_4$ on the fourth subcarrier of the second channel.

For example, the four high-order modulated signals $x_1$, $x_2$, $x_3$, and $x_4$ may be obtained by multiplying the channel matrix Q by four low-order modulated signals $s_2$, $s_3$, and $s_4$, and are for example expressed as follows:

$$\begin{bmatrix} x_1 \\ x_2 \\ x_3 \\ x_4 \end{bmatrix} = \underbrace{\begin{bmatrix} \alpha_{11} & \alpha_{12} & \alpha_{13} & \alpha_{14} \\ \alpha_{21} & \alpha_{22} & \alpha_{23} & \alpha_{24} \\ \alpha_{31} & \alpha_{32} & \alpha_{33} & \alpha_{34} \\ \alpha_{41} & \alpha_{42} & \alpha_{43} & \alpha_{44} \end{bmatrix}}_{Q} \begin{bmatrix} s_1 \\ s_2 \\ s_3 \\ s_4 \end{bmatrix}$$

Therefore, the four high-order modulated signals are transmitted on the four subcarriers of the two channels. This can improve efficiency of a diversity gain.

It should be understood that the numbers "first, second, ..." in this embodiment of this application are merely intended to differentiate between different objects, for example, to differentiate between different modulated signals, different subcarriers, different channels, or the like, and do not constitute a limitation on this embodiment of this application. Numbers "first, second, ..." in the following embodiments do not constitute a limitation on the embodiments either.

FIG. 10 is a schematic diagram of an example of two-channel aggregation according to an embodiment of this application. As shown in FIG. 10, a first high-order modulated signal $x_1$ is transmitted on a first subcarrier of a first channel, a second high-order modulated signal $x_2$ is transmitted on a second subcarrier of a second channel, a third high-order modulated signal $x_3$ is transmitted on a third subcarrier of the first channel, and a fourth high-order modulated signal $x_4$ is transmitted on a fourth subcarrier of the second channel. In this way, high-order modulated signals are transmitted on a plurality of subcarriers of a plurality of channels, thereby implementing a diversity gain. The first subcarrier and the second subcarrier have a same sequence number, and the third subcarrier and the fourth subcarrier have a same sequence number. A spacing between the first subcarrier and the third subcarrier is half of a quantity of subcarriers used by a user to transmit data.

Optionally, the plurality of low-order modulated signals are $s_1$, $s_2$, $s_3$, and $s_4$, and the channel matrix s any one of the following:

$$Q = \frac{1}{\sqrt{2}} \begin{bmatrix} 1 & j & 0 & 0 \\ 0 & 0 & 1 & j \\ 0 & 0 & 1 & -j \\ 1 & -j & 0 & 0 \end{bmatrix},$$

-continued $$Q = \frac{1}{\sqrt{10}} \begin{bmatrix} 1 & j & 2 & 2j \\ 2 & j & 2 & 2j \\ -2 & -2j & 1 & j \\ -2 & -2j & 1 & j \end{bmatrix},$$

$$Q = \frac{1}{\sqrt{8}} \begin{bmatrix} 1 & 2 & 0 & 0 \\ 0 & 0 & 1 & 2 \\ 0 & 0 & -2 & 1 \\ -2 & 1 & 0 & 0 \end{bmatrix}, \text{ and}$$

$$Q = \frac{1}{\sqrt{85}} \begin{bmatrix} 8 & 4 & 2 & 1 \\ 1 & 8 & 4 & 2 \\ 2 & 1 & 8 & 4 \\ 4 & 2 & 1 & 8 \end{bmatrix}.$$

The following describes this embodiment of this application in detail with reference to examples. It should be noted that the examples in the foregoing and following descriptions are merely intended to help a person skilled in the art better understand this embodiment of this application, but not to limit the scope of this embodiment of this application.

For a DCM solution based on two-channel aggregation, the following cases are for example included:

(1) a. When two-channel aggregation is used for BPSK, high-order modulated signals and low-order modulated signals are expressed as follows:

$$\begin{bmatrix} x_1 \\ x_2 \\ x_3 \\ x_4 \end{bmatrix} = \frac{1}{\sqrt{2}} \underbrace{\begin{bmatrix} 1 & j & 0 & 0 \\ 0 & 0 & 1 & j \\ 0 & 0 & 1 & -j \\ 1 & -j & 0 & 0 \end{bmatrix}}_{Q} \begin{bmatrix} s_1 \\ s_2 \\ s_3 \\ s_4 \end{bmatrix},$$

where the channel matrix Q is $$Q = \frac{1}{\sqrt{2}} \begin{bmatrix} 1 & j & 0 & 0 \\ 0 & 0 & 1 & j \\ 0 & 0 & 1 & -j \\ 1 & -j & 0 & 0 \end{bmatrix},$$

$s_1, s_2, s_3, s_4$ are BPSK modulated signals, $x_1, x_2, x_3, x_4$ are QPSK modulated signals, $x_3 = x_2'$, $x_4 = x_1'$, and ( )' means obtaining a conjugate.

For example, FIG. 11 is a schematic diagram of an example of two-channel aggregation according to an embodiment of this application. As shown in FIG. 11, in this example, a first high-order modulated signal $x_1$ is transmitted on a first subcarrier of a first channel, a second high-order modulated signal $x_2$ is transmitted on a second subcarrier of a second channel, a third high-order modulated signal $x_3$ is transmitted on a third subcarrier of the first channel, and a fourth high-order modulated signal $x_4$ is transmitted on a fourth subcarrier of the second channel, where $x_3 = x_2'$, $x_4 = x_1'$ and ( )' means obtaining a conjugate.

Therefore, in this exemplary implementation, the four high-order modulated signals are transmitted on the four subcarriers of the two channels. This can improve efficiency of a diversity gain.

b. When two-channel aggregation is used for BPSK, high-order modulated signals and low-order modulated signals are expressed as follows:

$$\begin{bmatrix} x_1 \\ x_2 \\ x_3 \\ x_4 \end{bmatrix} = \frac{1}{\sqrt{10}} \underbrace{\begin{bmatrix} 1 & j & 2 & 2j \\ 1 & j & 2 & 2j \\ -2 & -2j & 1 & j \\ -2 & -2j & 1 & j \end{bmatrix}}_{Q} \begin{bmatrix} s_1 \\ s_2 \\ s_3 \\ s_4 \end{bmatrix},$$

where
the channel matrix Q is $$Q = \frac{1}{\sqrt{10}} \begin{bmatrix} 1 & j & 2 & 2j \\ 1 & j & 2 & 2j \\ -2 & -2j & 1 & j \\ -2 & -2j & 1 & j \end{bmatrix},$$

$s_1, s_2, s_3, s_4$, are BPSK modulated signals, $x_1, x_2, x_3, x_4$ are 16QAM modulated signals, and $x_1, x_2, x_3, x_4$ are obtained by combining the BPSK modulated signals $s_1, s_2, s_3, s_4$ by using different coefficients.

For example, FIG. 12 is a schematic diagram of an example of two-channel aggregation according to an embodiment of this application. As shown in FIG. 12, in this example, a first high-order modulated signal $x_1$ is transmitted on a first subcarrier of a first channel, a second high-order modulated signal $x_2$ is transmitted on a second subcarrier of a second channel, a third high-order modulated signal $x_3$ is transmitted on a third subcarrier of the first channel, and a fourth high-order modulated signal $x_4$ is transmitted on a fourth subcarrier of the second channel.

Therefore, in this exemplary implementation, the four high-order modulated signals are transmitted on the four subcarriers of the two channels. This can improve efficiency of a diversity gain.

(2) a. When two-channel aggregation is used for QPSK, high-order modulated signals and low-order modulated signals are expressed as follows:

$$\begin{bmatrix} x_1 \\ x_2 \\ x_3 \\ x_4 \end{bmatrix} = \frac{1}{\sqrt{5}} \underbrace{\begin{bmatrix} 1 & 2 & 0 & 0 \\ 0 & 0 & 1 & 2 \\ 0 & 0 & -2 & 1 \\ -2 & 1 & 0 & 0 \end{bmatrix}}_{Q} \begin{bmatrix} s_1 \\ s_2 \\ s_3 \\ s_4 \end{bmatrix},$$

where
the channel matrix Q is $$Q = \frac{1}{\sqrt{5}} \begin{bmatrix} 1 & 2 & 0 & 0 \\ 0 & 0 & 1 & 2 \\ 0 & 0 & -2 & 1 \\ -2 & 1 & 0 & 0 \end{bmatrix},$$

$s_1, s_2, s_3, s_4$, are QPSK modulated signals, $x_1, x_2, x_3, x_4$ are 16QAM modulated signals, $x_1, x_4$ are obtained by combining a group of QPSK modulated signals $s_1, s_2$ by using different coefficients, and $x_2, x_3$ are obtained by combining a group of QPSK modulated signals $s_3, s_4$ by using different coefficients.

For example, FIG. 13 is a schematic diagram of an example of two-channel aggregation according to an embodiment of this application. As shown in FIG. 13, in this example, a first high-order modulated signal $x_1$ is transmitted on a first subcarrier of a first channel, a second high-order modulated signal $x_2$ is transmitted on a second subcarrier of a second channel, a third high-order modulated signal $x_3$ is transmitted on a third subcarrier of the first channel, and a fourth high-order modulated signal $x_4$ is transmitted on a fourth subcarrier of the second channel.

Therefore, in this exemplary implementation, the four high-order modulated signals are transmitted on the four subcarriers of the two channels. This can improve efficiency of a diversity gain.

b. When two-channel aggregation is used for QPSK, high-order modulated signals and low-order modulated signals are expressed as follows:

$$\begin{bmatrix} x_1 \\ x_2 \\ x_3 \\ x_4 \end{bmatrix} = \underbrace{\frac{1}{\sqrt{85}} \begin{bmatrix} 8 & 4 & 2 & 1 \\ 1 & 8 & 4 & 2 \\ 2 & 1 & 8 & 4 \\ 4 & 2 & 1 & 8 \end{bmatrix}}_{Q} \begin{bmatrix} s_1 \\ s_2 \\ s_3 \\ s_4 \end{bmatrix},$$

where
the channel matrix Q is $$Q = \frac{1}{\sqrt{85}} \begin{bmatrix} 8 & 4 & 2 & 1 \\ 1 & 8 & 4 & 2 \\ 2 & 1 & 8 & 4 \\ 4 & 2 & 1 & 8 \end{bmatrix},$$

$s_1, s_2, s_3, s_4$, are QPSK modulated signals, $x_1, x_2, x_3, x_4$ are 256QAM modulated signals, and $x_1, x_2, x_3, x_4$ are obtained by combining the four QPSK modulated signals $s_1, s_2, s_3, s_4$ by using different coefficients.

For example, FIG. 14 is a schematic diagram of an example of two-channel aggregation according to an embodiment of this application. As shown in FIG. 14, in this example, a first high-order modulated signal $x_1$ is transmitted on a first subcarrier of a first channel, a second high-order modulated signal $x_2$ is transmitted on a second subcarrier of a second channel, a third high-order modulated signal $x_3$ is transmitted on a third suborder of the first channel, and a fourth high-order modulated signal $x_4$ is transmitted on a fourth subcarrier of the second channel.

Therefore, in this exemplary implementation, the four high-order modulated signals are transmitted on the four subcarriers of the two channels. This can improve efficiency of a diversity gain.

(3) When two-channel aggregation is used for QPSK and QAM, high-order modulated signals and low-order modulated signals are expressed as follows:

$$\begin{bmatrix} x_1 \\ x_2 \\ x_3 \\ x_4 \end{bmatrix} = \underbrace{\frac{1}{\sqrt{5}} \begin{bmatrix} 1 & 2 & 0 & 0 \\ 0 & 0 & 1 & 2 \\ 0 & 0 & -2 & 1 \\ -2 & 1 & 0 & 0 \end{bmatrix}}_{Q} \begin{bmatrix} s_1 \\ s_2 \\ s_3 \\ s_4 \end{bmatrix},$$

where
the channel matrix Q is $$Q = \frac{1}{\sqrt{5}} \begin{bmatrix} 1 & 2 & 0 & 0 \\ 0 & 0 & 1 & 2 \\ 0 & 0 & -2 & 1 \\ -2 & 1 & 0 & 0 \end{bmatrix},$$

$s_1, s_3$ are QPSK modulated signals, $s_2, s_4$ are 16QAM modulated signals, $x_1, x_2, x_3, x_4$ are 64QAM modulated signals, $x_1, x_4$ are obtained by combining the QPSK modulated signal $s_1$ and the 16QAM modulated signal $s_2$ by using different coefficients, and $x_2, x_3$ are obtained by combining the QPSK modulated signal $s_3$ and the 16QAM modulated signal $s_4$ by using different coefficients.

For example, FIG. 15 is a schematic diagram of an example of two-channel aggregation according to an embodiment of this application. As shown in FIG. 15, in this example, a first high-order modulated signal $x_1$ is transmitted on a first subcarrier of a first channel, a second high-order modulated signal $x_2$ is transmitted on a second subcarrier of a second channel, a third high-order modulated signal $x_3$ is transmitted on a third subcarrier of the first channel, and a fourth high-order modulated signal $x_4$ is transmitted on a fourth subcarrier of the second channel.

Therefore, in this exemplary implementation, the four high-order modulated signals are transmitted on the four subcarriers of the two channels. This can improve efficiency of a diversity gain.

It should be understood that the foregoing plurality of two-channel aggregation solutions are merely intended to help a person skilled in the art understand the technical solutions of this application, and do not constitute a limitation on this application. The foregoing combination manners of the high-order modulated signals and the low-order modulated signals may alternatively be another proper combination manner. This is not limited.

Therefore, in the signal transmission method in this embodiment of this application, the plurality of low-order modulated signals are combined into the N high-order modulated signals; and the N high-order modulated signals are transmitted on the N subcarriers, where the N subcarriers are the subcarriers on the frequency domain resources of the M channels. For example, the k of the N high-order modulated signals are transmitted on the k subcarriers of the $m^{th}$ channel in the M channels. This can improve efficiency of a diversity gain.

Optionally, in an embodiment, when M=3 and N=9, the M channels are a first channel, a second channel, and a third channel, the N subcarriers are a first subcarrier, a second subcarrier, a third subcarrier, a fourth subcarrier, a fifth subcarrier, a sixth subcarrier, a seventh subcarrier, an eighth subcarrier, and a ninth subcarrier, and the N high-order modulated signals are a first high-order modulated signal $x_1$, a second high-order modulated signal $x_2$, a third high-order modulated signal $x_3$, a fourth high-order modulated signal $x_4$, a fifth high-order modulated signal $x_5$, a sixth high-order modulated signal $x_6$, a seventh high-order modulated signal $x_7$, an eighth high-order modulated signal $x_8$, and a ninth high-order modulated signal $x_9$; and the transmitting the N high-order modulated signals on N subcarriers includes:
transmitting the first high-order modulated signal $x_1$ on the first subcarrier of the first channel;

transmitting the second high-order modulated signal $x_2$ on the second subcarrier of the second channel;

transmitting the third high-order modulated signal $x_3$ on the third subcarrier of the third channel;

transmitting the fourth high-order modulated signal $x_4$ on the fourth subcarrier of the first channel;

transmitting the fifth high-order modulated signal $x_5$ on the fifth subcarrier of the second channel;

transmitting the sixth high-order modulated signal $x_6$ on the sixth subcarrier of the third channel;

transmitting the seventh high-order modulated signal $x_7$ on the seventh subcarrier of the first channel;

transmitting the eighth high-order modulated signal $x_8$ on the eighth subcarrier of the second channel; and transmitting the ninth high-order modulated signal $x_9$ on the ninth subcarrier of the third channel.

For example, when a three-channel aggregation solution is used, the nine high-order modulated signals $x_1, x_2, \ldots, x_4$ can be output by multiplying nine low-order modulated signals $s_1, s_2, \ldots, s_9$ by the matrix Q. For example, FIG. 16 is a schematic diagram of an example of three-channel aggregation according to an embodiment of this application. As shown in FIG. 16, an exemplary transmission solution of high-order modulated signals is: transmitting a first high-order modulated signal $x_1$ on a first subcarrier of a first channel, transmitting a second high-order modulated signal $x_2$ on a second subcarrier of a second channel, transmitting a third high-order modulated signal $x_3$ on a third subcarrier of a third channel, transmitting a fourth high-order modulated signal $x_4$ on a fourth subcarrier of the first channel, transmitting a fifth high-order modulated signal $x_5$ on a fifth subcarrier of the second channel, transmitting a sixth high-order modulated signal $x_6$ on a sixth subcarrier of the third channel, transmitting a seventh high-order modulated signal $x_7$ on a seventh subcarrier of the first channel, transmitting an eighth high-order modulated signal $x_8$ on an eighth subcarrier of the second channel, and transmitting a ninth high-order modulated signal on a ninth subcarrier of the third channel. In this way, high-order modulated signals are transmitted on a plurality of subcarriers of a plurality of channels, thereby improving efficiency of a diversity gain.

The first subcarrier, the second subcarrier, and the third subcarrier have a same sequence number, the fourth subcarrier, the fifth subcarrier, and the sixth subcarrier have a same sequence number, and the seventh subcarrier, the eighth subcarrier, and the ninth subcarrier have a same sequence number. A spacing between the first subcarrier and the fourth subcarrier and a spacing between the fourth subcarrier and the seventh subcarrier are one third of a quantity of subcarriers used to transmit data in 802.12ay.

For example, the nine high-order modulated signals $x_1, x_2, x_3, x_4, \ldots, x_9$ may be obtained by multiplying the nine low-order modulated signals $s_1, s_2, \ldots, s_3$ by the matrix Q, and are for example expressed as follows:

$$\begin{bmatrix} x_1 \\ x_2 \\ x_3 \\ x_4 \\ x_5 \\ x_6 \\ x_7 \\ x_8 \\ x_9 \end{bmatrix} = \underbrace{\begin{bmatrix} \alpha_{11} & \alpha_{12} & \alpha_{13} & \alpha_{14} & \alpha_{15} & \alpha_{16} & \alpha_{17} & \alpha_{18} & \alpha_{19} \\ \alpha_{21} & \alpha_{22} & \alpha_{23} & \alpha_{24} & \alpha_{25} & \alpha_{26} & \alpha_{27} & \alpha_{28} & \alpha_{29} \\ \alpha_{31} & \alpha_{32} & \alpha_{33} & \alpha_{34} & \alpha_{35} & \alpha_{36} & \alpha_{37} & \alpha_{38} & \alpha_{39} \\ \alpha_{41} & \alpha_{42} & \alpha_{43} & \alpha_{44} & \alpha_{45} & \alpha_{46} & \alpha_{47} & \alpha_{48} & \alpha_{49} \\ \alpha_{51} & \alpha_{52} & \alpha_{53} & \alpha_{54} & \alpha_{55} & \alpha_{56} & \alpha_{57} & \alpha_{58} & \alpha_{59} \\ \alpha_{61} & \alpha_{62} & \alpha_{63} & \alpha_{64} & \alpha_{65} & \alpha_{66} & \alpha_{67} & \alpha_{68} & \alpha_{69} \\ \alpha_{71} & \alpha_{72} & \alpha_{73} & \alpha_{74} & \alpha_{75} & \alpha_{76} & \alpha_{77} & \alpha_{78} & \alpha_{79} \\ \alpha_{81} & \alpha_{82} & \alpha_{83} & \alpha_{84} & \alpha_{85} & \alpha_{86} & \alpha_{87} & \alpha_{88} & \alpha_{89} \\ \alpha_{91} & \alpha_{92} & \alpha_{93} & \alpha_{94} & \alpha_{95} & \alpha_{96} & \alpha_{97} & \alpha_{98} & \alpha_{99} \end{bmatrix}}_{Q} \begin{bmatrix} s_1 \\ s_2 \\ s_3 \\ s_4 \\ s_5 \\ s_6 \\ s_7 \\ s_8 \\ s_9 \end{bmatrix}$$

Optionally, the plurality of low-order modulated signals are $s_1, s_2, s_3, s_4, s_5, s_6, s_7, s_8$, and $s_9$, and the channel matrix Q is:

$$Q = \frac{1}{\sqrt{21}} \begin{bmatrix} 4 & 2 & 1 & 0 & 0 & 0 & 0 & 0 & 0 \\ 0 & 0 & 0 & 4 & 2 & 1 & 0 & 0 & 0 \\ 0 & 0 & 0 & 0 & 0 & 0 & 4 & 2 & 1 \\ 0 & 0 & 0 & 0 & 0 & 0 & 1 & 4 & 2 \\ 1 & 4 & 2 & 0 & 0 & 0 & 0 & 0 & 0 \\ 0 & 0 & 0 & 1 & 4 & 2 & 0 & 0 & 0 \\ 0 & 0 & 0 & 2 & 1 & 4 & 0 & 0 & 0 \\ 0 & 0 & 0 & 0 & 0 & 0 & 2 & 1 & 4 \\ 2 & 1 & 4 & 0 & 0 & 0 & 0 & 0 & 0 \end{bmatrix}$$

With reference to an example, the following describes a solution for a case of three-channel aggregation. An exemplary description is provided as follows:

When three-channel aggregation is used for 64QAM, high-order modulated signals and low-order modulated signals are expressed as follows:

$$\begin{bmatrix} x_1 \\ x_2 \\ x_3 \\ x_4 \\ x_5 \\ x_6 \\ x_7 \\ x_8 \\ x_9 \end{bmatrix} = \underbrace{\frac{1}{\sqrt{21}} \begin{bmatrix} 4 & 2 & 1 & 0 & 0 & 0 & 0 & 0 & 0 \\ 0 & 0 & 0 & 4 & 2 & 1 & 0 & 0 & 0 \\ 0 & 0 & 0 & 0 & 0 & 0 & 4 & 2 & 1 \\ 0 & 0 & 0 & 0 & 0 & 0 & 1 & 4 & 2 \\ 1 & 4 & 2 & 0 & 0 & 0 & 0 & 0 & 0 \\ 0 & 0 & 0 & 1 & 4 & 2 & 0 & 0 & 0 \\ 0 & 0 & 0 & 2 & 1 & 4 & 0 & 0 & 0 \\ 0 & 0 & 0 & 0 & 0 & 0 & 2 & 1 & 4 \\ 2 & 1 & 4 & 0 & 0 & 0 & 0 & 0 & 0 \end{bmatrix}}_{Q} \begin{bmatrix} s_1 \\ s_2 \\ s_3 \\ s_4 \\ s_5 \\ s_6 \\ s_7 \\ s_8 \\ s_9 \end{bmatrix},$$

where the channel matrix Q is $$Q = \frac{1}{\sqrt{21}} \begin{bmatrix} 4 & 2 & 1 & 0 & 0 & 0 & 0 & 0 & 0 \\ 0 & 0 & 0 & 4 & 2 & 1 & 0 & 0 & 0 \\ 0 & 0 & 0 & 0 & 0 & 0 & 4 & 2 & 1 \\ 0 & 0 & 0 & 0 & 0 & 0 & 1 & 4 & 2 \\ 1 & 4 & 2 & 0 & 0 & 0 & 0 & 0 & 0 \\ 0 & 0 & 0 & 1 & 4 & 2 & 0 & 0 & 0 \\ 0 & 0 & 0 & 2 & 1 & 4 & 0 & 0 & 0 \\ 0 & 0 & 0 & 0 & 0 & 0 & 2 & 1 & 4 \\ 2 & 1 & 4 & 0 & 0 & 0 & 0 & 0 & 0 \end{bmatrix},$$

$s_1, s_2, s_3, s_4, s_5, s_6, s_7, s_8, s_9$ are modulated signals, $x_1, x_2, x_3, x_4, x_5, x_6, x_7, x_8, x_9$ are QPSK modulated signals, $x_1, x_5, x_9$ are three QPSK signals that are obtained by combining 64QAM signals $s_1, s_2, s_3$ by using different coefficients, $x_2, x_6, x_7$ are three QPSK signals that are obtained by combining 64QAM signals $s_4, s_5, s_6$ by using different coefficients, and $x_3, x_4, x_8$ are three QPSK signals that are obtained by combining 64QAM signals $s_7, s_8, s_9$ by using different coefficients.

For example, FIG. 17 is a schematic diagram of an example of three-channel aggregation according to an embodiment of this application. As shown in FIG. 17, in this example, an exemplary transmission solution of high-order modulated signals is: transmitting a first high-order modulated signal $x_1$ on a first subcarrier of a first channel, transmitting a second high-order modulated signal $x_2$ on a second subcarrier of a second channel, transmitting a third high-order modulated signal $x_3$ on a third subcarrier of a third channel, transmitting a fourth high-order modulated signal $x_4$ on a fourth subcarrier of the first channel, transmitting a fifth high-order modulated signal $x_5$ on a fifth subcarrier of the second channel, transmitting a sixth high-order modulated signal $x_6$ on a sixth subcarrier of the third channel, transmitting a seventh high-order modulated signal $x_7$ on a seventh subcarrier of the first channel, transmitting an eighth high-order modulated signal $x_8$ on an eighth subcarrier of the second channel, and transmitting a ninth high-order modulated signal $x_9$ on a ninth subcarrier of the third channel. In this way, high-order modulated signals are transmitted on a plurality of subcarriers of a plurality of channels, thereby improving efficiency of a diversity gain.

Therefore, in this exemplary implementation, the nine high-order modulated signals are transmitted on the nine subcarriers of the three channels. This can improve efficiency of a diversity gain.

Therefore, in the signal transmission method in this embodiment of this application, the plurality of low-order modulated signals are combined into the N high-order modulated signals; and the N high-order modulated signals are transmitted on the N subcarriers, where the N subcarriers are the subcarriers on the frequency domain resources of the M channels. For example, the k of the N high-order modulated signals are transmitted on the k subcarriers of the $m^{th}$ channel in the M channels. This can improve efficiency of a diversity gain.

The foregoing describes this embodiment of this application in the plurality of cases of "channel aggregation". The following describes exemplary embodiments of the "wideband channel" solution. Before the exemplary embodiments are described, an implementation principle of the "wideband channel" solution is described with reference to FIG. 18.

Figure 18:
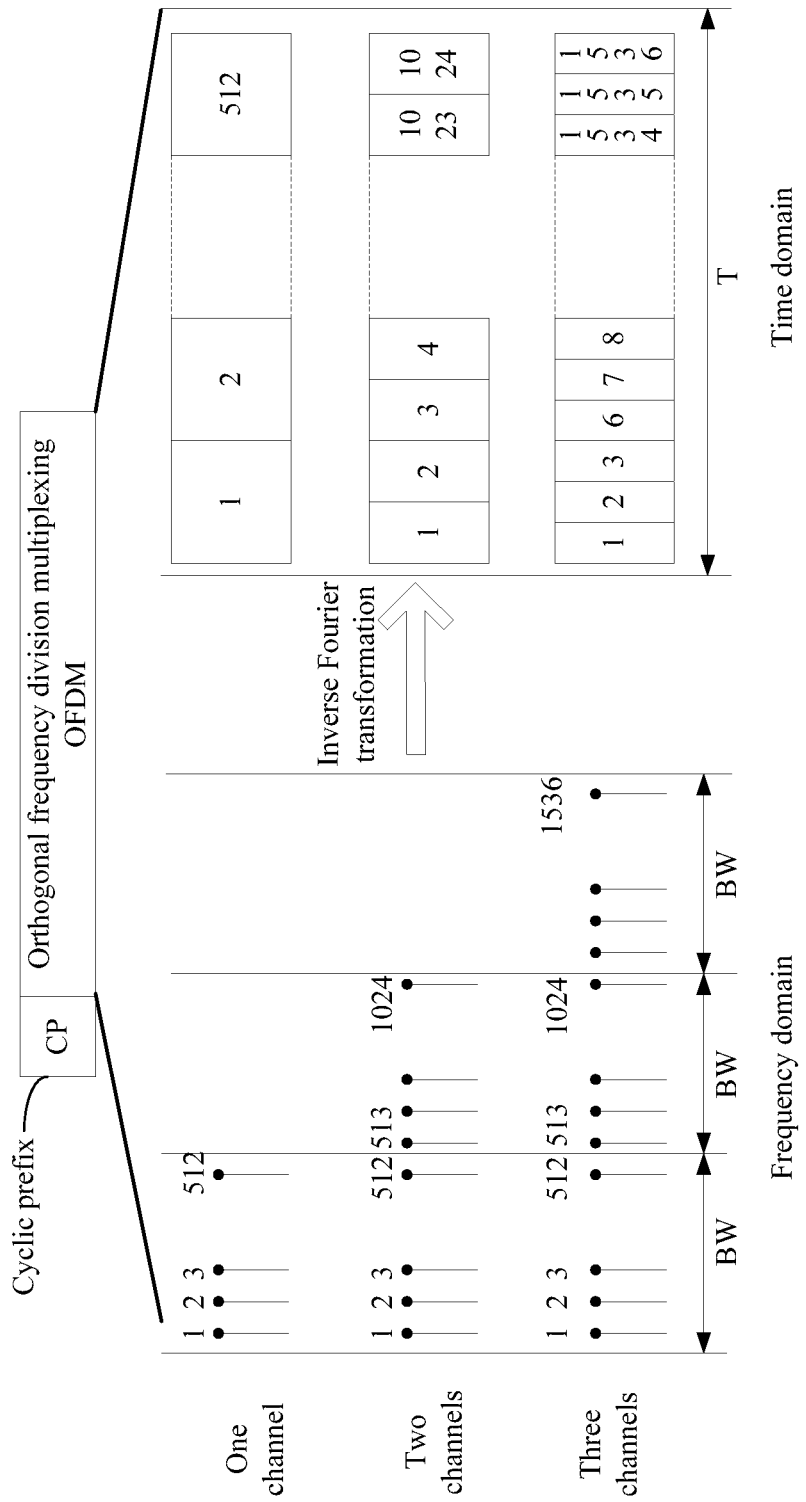
FIG. 18 is a schematic diagram of a data structure of a wideband channel.

FIG. 18 is a schematic diagram of an OFDM data structure. As shown in FIG. 18, a multi-carrier OFDM data structure includes a cyclic prefix (CP) and an OFDM symbol. A subcarrier in frequency domain of the OFDM symbol is used to transmit data, a modulated OFDM symbol (where the symbol may be understood as a modulated signal) forms a frequency domain data block, and then the frequency domain data block is converted into a corresponding time domain signal through inverse Fourier transformation.

In FIG. 18, for one channel, there are 512 subcarriers for the channel in frequency domain, a subcarrier spacing is ΔF and is 5.15625 MHz in 11ad, and a corresponding bandwidth (BW) is BW=2.64 GHz, Correspondingly, a signal transmission time in time domain is ΔT and is 0.38 ns in 11 ad, a total of 512 signals are transmitted, and a corresponding total transmission time is equal to 194 ns.

In FIG. 18, for two channels, there are 1024 subcarriers for the two channels in frequency domain, a subcarrier spacing ΔF keeps unchanged, and a corresponding bandwidth is 2BW=5.28 GHz, Correspondingly, a signal transmission time in time domain is ΔT and is 0.19 ns, a total of 1024 signals are transmitted, and a corresponding total transmission time keeps unchanged.

In FIG. 18, for three channels, there are 1536 subcarriers for the three channels in frequency domain, a subcarrier spacing ΔF keeps unchanged, and a corresponding bandwidth is BW=7.92 GHz. Correspondingly, a signal transmission time in time domain is ΔT and is 0.1267 ns, a total of 1536 signals are transmitted, and a corresponding total transmission time T keeps unchanged.

Optionally, in an embodiment, the transmitting the N high-order modulated signals on N subcarriers includes:

transmitting the N high-order modulated signals on the N subcarriers of N subbands, where the $n^{th}$ subcarrier in the N subcarriers is a subcarrier of an $n^{th}$ subband in the N subbands, and the N subbands are subbands on the frequency domain resources of the M channels.

For example, a plurality of high-order modulated signals may be transmitted on a plurality of subcarriers of a plurality of subbands. The plurality of subcarriers are subcarriers of the plurality of subbands. For example, the N high-order modulated signals are transmitted on the N subcarriers of the N subbands, and the $n^{th}$ subcarrier in the N subcarriers is the subcarrier of the $n^{th}$ subband in the N subbands. In other words, a subcarrier used to transmit a high-order modulated signal is a subcarrier of a subband. The plurality of subbands are a plurality of subbands obtained by dividing a wideband channel based on a frequency domain resource. In this way, the high-order modulated signals may be transmitted on the plurality subcarriers of the plurality of subbands.

Therefore, in the signal transmission method in this embodiment of this application, the plurality of low-order modulated signals are combined into the N high-order modulated signals; and the N high-order modulated signals are transmitted on the N subcarriers, where the N subcarriers are the subcarriers on the frequency domain resources of the M channels. For example, the N high-order modulated signals are transmitted on the N subcarriers of a plurality of subbands. This can improve efficiency of a diversity gain.

Optionally, in an embodiment, when N=4, the N subbands are a first subband, a second subband, a third subband, and a fourth subband, the N subcarriers are a first subcarrier, a second subcarrier, a third subcarrier, and a fourth subcarrier, the N high-order modulated signals are a first high-order modulated signal $x_1=\alpha_1 s_1+\beta_1 s_2$, a second high-order modulated signal $x_2=\alpha_2 s_1+\beta_2 s_2$, a third high-order modulated signal $x_1^*=(\alpha_1 s_1+\beta_1 s_2)^*$, and a fourth high-order modulated signal $x_2^*=(\alpha_2 s_1+\beta_2 s_2)^*$, $x_1^*$ is a conjugate of $x_1$, and $x_2^*$ is a conjugate of $x_2$; and the transmitting the N high-order modulated signals on the N subcarriers of N subbands includes:

transmitting the first high-order modulated signal $x_1=\alpha_1 s_1+\beta_1 s_2$ on the first subcarrier of the first subband;

transmitting the second high-order modulated signal $x_2=\alpha_2 s_1+\beta_2 s_2$ on the second subcarrier of the second subband;

transmitting the third high-order modulated signal $x_1^*=(\alpha_1 s_1+\beta_1 s_2)^*$ on the third subcarrier of the third subband; and transmitting the fourth high-order modulated signal $x_2^*=(\alpha_2 s_1+\beta_2 s_2)^*$ on the fourth subcarrier of the fourth subband.

Figure 19:
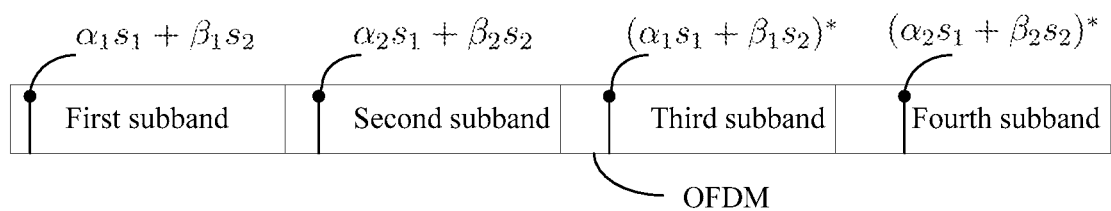
FIG. 19 is a schematic diagram of an example of a wideband channel according to an embodiment of this application.

For example, OFDM subcarriers in frequency domain may be divided into four subbands or subblocks. Then the to-be-sent low-order modulated signals $s_1$ and $s_2$ are combined into the four high-order modulated signals, and the four high-order modulated signals are respectively transmitted on subcarriers of the four subbands. FIG. 19 is a schematic diagram of a transmission solution for a case in which OFDM subcarriers in frequency domain are divided into four subbands. As shown in FIG. 19, the exemplary transmission solution is: transmitting a first high-order modulated signal $x_1=\alpha_1 s_1+\beta_1 s_2$ on a first subcarrier of a first subband, transmitting a second high-order modulated signal $x_1=\alpha_1 s_1+\beta_1 s_2$ on a second subcarrier of a second subband, transmitting a third high-order modulated signal $x_1^*=(\alpha_1 s_1+\beta_1 s_2)^*$ on a third subcarrier of a third subband, and transmitting a fourth high-order modulated signal $x_2^*(\alpha_2 s_1+\beta_2 s_2)^*$ on a fourth subcarrier of a fourth subband. $x_1^*=(\alpha_1 s_1+\beta_1 s_2)^*$ is a conjugate of $x_1=\alpha_1 s_1+\beta_1 s_2$, and $x_2^*(\alpha_2 s_1+\beta_2 s_2)^*$ is a conjugate of $x_2=\alpha_2 s_1+\beta_2 s_2$.

In this embodiment of this application, each of the four high-order modulated signals is transmitted on a subcarrier of the four subbands. It should be understood that other subcarriers of the subbands may also be used to transmit high-order modulated signals. This is not limited. For example, in this example, if there are 1000 high-order modulated signals, the 1000 high-order modulated signals may be transmitted concurrently on a plurality of subcarriers of the four subbands by treating every four high-order modulated signals as a group. Certainly, this is merely intended to help a person skilled in the art understand this solution, and does not constitute a limitation on this application.

In this embodiment of this application, the first subband in FIG. 19 is used as an example. A signal transmitted on the first subcarrier of the first subband is $x_1=\alpha_1 s_1+\beta_1 s_2$. Another high-order modulated signal may also be transmitted on another subcarrier of the first subband. The first subcarrier of the first subband is used herein only as an example for description.

It should be noted that a subcarrier of the first subband is not limited to transmitting only $x_1=\alpha_1 s_1+\beta_1 s_2$ in FIG. 19. An example in which $x_1=\alpha_1 s_1+\beta_1 s_2$ is transmitted on the first subcarrier of the first subband is used herein only for schematic description. In an exemplary application, other high-order modulated signals may be transmitted concurrently on other subcarriers, excluding the first subcarrier, of the first subband. This is not limited. Other subbands in FIG. 19 and cases that appear below are similar to the first subband. Details are not described in the following.

Therefore, in this exemplary implementation, the four high-order modulated signals are transmitted on the four subcarriers of the four subbands. This can improve efficiency of a diversity gain.

Optionally, the channel matrix Q is $$Q = \begin{bmatrix} \alpha_1 & \beta_1 \\ \alpha_2 & \beta_2 \end{bmatrix},$$

where $$\alpha_1 = \frac{1}{\sqrt{2}}, \beta_1 = \frac{1}{\sqrt{2}} j, \alpha_2 = \frac{1}{\sqrt{2}}, \text{ and } \beta_2 = -\frac{1}{\sqrt{2}} j;$$

or the channel matrix Q is $$Q = \begin{bmatrix} \alpha_1 & \beta_1 \\ \alpha_2 & \beta_2 \end{bmatrix},$$

where $$\alpha_1 = \frac{1}{\sqrt{5}}, \beta_1 = \frac{2}{\sqrt{5}}, \alpha_2 = -\frac{2}{\sqrt{5}}, \text{ and } \beta_2 = \frac{1}{\sqrt{5}}.$$

For example, when the low-order modulated signals $s_1$ and $s_2$ are BPSK modulated signals, and the high-order modulated signals $x_1$ and $x_2$ are QPSK signals, $$\alpha_1 = \frac{1}{\sqrt{2}}, \beta_1 = \frac{1}{\sqrt{2}} j, \alpha_2 = \frac{1}{\sqrt{2}}, \beta_2 = -\frac{1}{\sqrt{2}} j,$$

and the corresponding channel matrix Q that is $$Q = \begin{bmatrix} \alpha_1 & \beta_1 \\ \alpha_2 & \beta_2 \end{bmatrix}$$

may be obtained with reference to the combination coefficients in Table 1; or when the low-order modulated signals $s_1$ and $s_2$ are QPSK modulated signals, and the high-order modulated signals $x_1$ and $x_2$ are 16QAM signals, $$\alpha_1 = \frac{1}{\sqrt{5}}, \beta_1 = \frac{2}{\sqrt{5}}, \alpha_2 = -\frac{2}{\sqrt{5}}, \beta_2 = \frac{1}{\sqrt{5}},$$

and the corresponding channel matrix Q that is $$Q = \begin{bmatrix} \alpha_1 & \beta_1 \\ \alpha_2 & \beta_2 \end{bmatrix}$$

may be obtained with reference to the combination coefficients in Table 2.

Therefore, in the signal transmission method in this embodiment of this application, the plurality of low-order modulated signals are combined into the N high-order modulated signals; and the N high-order modulated signals are transmitted on the N subcarriers, where the N subcarriers are the subcarriers on the frequency domain resources of the M channels. For example, the N modulated signals are transmitted on the N subcarriers of a plurality of subbands. This can improve efficiency of a diversity gain.

Optionally, in an embodiment, when N=3, the N subbands are a first subband, a second subband, and a third subband, the N subcarriers are a first subcarrier, a second subcarrier, and a third subcarrier, and the N high-order modulated signals are a first high-order modulated signal $x_1=\alpha_1 s_1+\beta_1 s_2+\gamma_1 s_3$, a second high-order modulated signal $x_2=\alpha_2 s_1+\beta_2 s_2+\gamma_2 s_3$, and a third high-order modulated signal $x_3=\alpha_3 s_1+\beta_3 s_2+\gamma_3 s_3$; and the transmitting the N high-order modulated signals on the N subcarriers of N subbands includes:

transmitting the first high-order modulated signal $x_1=\alpha_1 s_1+\beta_1 s_2+\gamma_1 s_3$ on the first subcarrier of the first subband;

transmitting the second high-order modulated signal $x_2=\alpha_2 s_1+\beta_2 s_2+\gamma_2 s_3$ on the second subcarrier of the second subband; and transmitting the third high-order modulated signal $x_3=\alpha_3 s_1+\beta_3 s_2+\gamma_3 s_3$ on the third subcarrier of the third subband.

Figure 20:
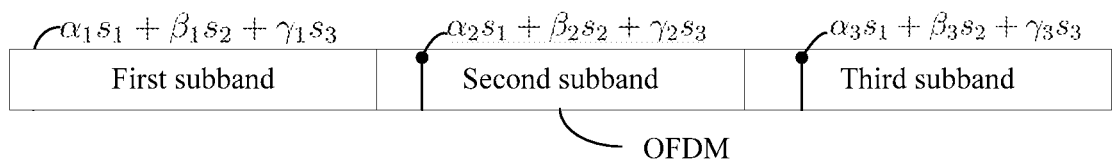
FIG. 20 is a schematic diagram of another example of a wideband channel according to an embodiment of this application.

For example, OFDM subcarriers in frequency domain may be divided into three subbands or subblocks. Then the to-be-sent low-order modulated signals $s_1$, $s_2$, and $s_3$, are respectively transmitted on subcarriers of the three subbands. FIG. 20 is a schematic diagram of a transmission solution for a case in which OFDM is divided into three subbands. As shown in FIG. 20, the exemplary transmission solution is: transmitting a first high-order modulated signal $x_1=\alpha_1 s_1+\beta_1 s_2+\gamma_1 s_3$ on a first subcarrier of a first subband, transmitting a second high-order modulated signal $x_2=\alpha_2 s_1+\beta_2 s_2+\gamma_2 s_3$ on a second subcarrier of a second subband, and transmitting a third high-order modulated signal $x_3=\alpha_3 s_1+\beta_3 s_2+\gamma_3 s_3$ on a third subcarrier of a third subband.

Therefore, in the signal transmission method in this embodiment of this application, the plurality of low-order modulated signals are combined into the N high-order modulated signals; and the N high-order modulated signals are transmitted on the N subcarriers, where the N subcarriers are the subcarriers on the frequency domain resources of the M channels. For example, the N modulated signals are transmitted on the N subcarriers of a plurality of subbands. This can improve efficiency of a diversity gain.

Optionally, the plurality of low-order modulated signals are $s_1$, $s_2$, and $s_3$; and the channel matrix Q is $$Q = \begin{bmatrix} \alpha_1 & \beta_1 & \gamma_1 \\ \alpha_2 & \beta_2 & \gamma_2 \\ \alpha_3 & \beta_3 & \gamma_3 \end{bmatrix},$$

where $$\alpha_1 = \frac{4}{\sqrt{21}}, \beta_1 = \frac{2}{\sqrt{21}}, \gamma_1 = \frac{1}{\sqrt{21}}, \alpha_2 = \frac{1}{\sqrt{21}}, \beta_2 = \frac{4}{\sqrt{21}},$$
$$\gamma_2 = \frac{2}{\sqrt{21}}, \text{ and } \alpha_3 = \frac{2}{\sqrt{21}}, \beta_2 = \frac{1}{\sqrt{21}}, \gamma_3 = \frac{4}{\sqrt{21}}.$$

For example, when the low-order modulated signals $s_1$, $s_2$, and $s_3$ are QPSK modulated signals, and the high-order modulated signals $x_1, x_2, x_3$ are 64QAM modulated signals, $$\alpha_1 = \frac{4}{\sqrt{21}}, \beta_1 = \frac{2}{\sqrt{21}}, \gamma_1 = \frac{1}{\sqrt{21}},$$
$$\alpha_2 = \frac{1}{\sqrt{21}}, \beta_2 = \frac{4}{\sqrt{21}}, \gamma_2 = \frac{2}{\sqrt{21}},$$
$$\alpha_3 = \frac{2}{\sqrt{21}}, \beta_2 = \frac{1}{\sqrt{21}}, \gamma_3 = \frac{4}{\sqrt{21}},$$

and the corresponding channel matrix Q that is $$Q = \begin{bmatrix} \alpha_1 & \beta_1 & \gamma_1 \\ \alpha_2 & \beta_2 & \gamma_2 \\ \alpha_3 & \beta_3 & \gamma_3 \end{bmatrix}$$

may be obtained by selecting any group of combination coefficients from the combination coefficients in Table 3.

Therefore, in this exemplary implementation, the three high-order modulated signals are transmitted on the three subcarriers of the three subbands. This can improve efficiency of a diversity gain.

It should be understood that values of $\alpha, \beta, \gamma$ may be any group of coefficients in Table 3. This is not limited.

Therefore, in the signal transmission method in this embodiment of this application, the plurality of low-order modulated signals are combined into the N high-order modulated signals; and the N high-order modulated signals are transmitted on the N subcarriers, where the N subcarriers are the subcarriers on the frequency domain resources of the M channels. For example, the N modulated signals are transmitted on the N subcarriers of a plurality of subbands. This can improve efficiency of a diversity gain.

The foregoing describes the signal transmission method in embodiments of this application in detail. The following describes a signal transmission apparatus in the embodiments of this application.

Figure 21:
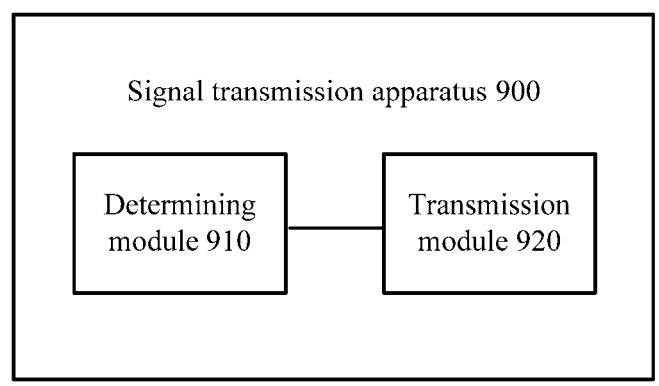
FIG. 21 is a schematic block diagram of a signal transmission apparatus according to an embodiment of this application.

FIG. 21 is a schematic block diagram of a signal transmission apparatus 900 according to an embodiment of this application. As shown in FIG. 21, the apparatus 900 includes:

a determining module 910, configured to combine a plurality of low-order modulated signals into N high-order modulated signals; and a transmission module 920, configured to transmit, on N subcarriers, the N high-order modulated signals determined by the determining module 910, where the N subcarriers are subcarriers on frequency domain resources of M channels, an $n^{th}$ high-order modulated signal in the N high-order modulated signals is transmitted on an $n^{th}$ subcarrier in the N subcarriers, N is an integer greater than or equal to 2, M is an integer greater than or equal to 2, and n=1, 2, ..., N.

The signal transmission apparatus in this embodiment of this application combines the plurality of low-order modulated signals into the N high-order modulated signals, and transmits the N high-order modulated signals on the N subcarriers, where the N subcarriers are the subcarriers on the frequency domain resources of the M channels. This can improve efficiency of a diversity gain.

Optionally, the determining module 910 is configured to: determine the N high-order modulated signals based on the plurality of low-order modulated signals and a channel matrix Q.

Optionally, in an embodiment, the transmission module 920 is configured to:

transmit k of the N high-order modulated signals on k subcarriers of an $m^{th}$ channel in the M channels, where N=M×k, k is an integer greater than 2, and m=1, 2, ..., M.

Optionally, in an embodiment, when M=2 and N=4, the M channels are a first channel and a second channel, the N subcarriers are a first subcarrier, a second subcarrier, a third subcarrier, and a fourth subcarrier, and the N high-order modulated signals are a first high-order modulated signal $x_1$, a second high-order modulated signal $x_2$, a third high-order modulated signal $x_3$, and a fourth high-order modulated signal $x_4$; and the transmission module is configured to:

transmit the first high-order modulated signal $x_1$ on the first subcarrier of the first channel;

transmit the second high-order modulated signal $x_2$ on the second subcarrier of the second channel;

transmit the third high-order modulated signal $x_3$ on the third subcarrier of the first channel; and transmit the fourth high-order modulated signal $x_4$ on the fourth subcarrier of the second channel.

Optionally, the plurality of low-order modulated signals are $s_1$, $s_2$, $s_3$, and $s_4$, and the channel matrix Q is any one of the following:

$$Q = \frac{1}{\sqrt{2}}\begin{bmatrix} 1 & j & 0 & 0 \\ 0 & 0 & 1 & j \\ 0 & 0 & 1 & -j \\ 1 & -j & 0 & 0 \end{bmatrix}, Q = \frac{1}{\sqrt{10}}\begin{bmatrix} 1 & j & 2 & 2j \\ 1 & j & 2 & 2j \\ -2 & -2j & 1 & j \\ -2 & -2j & 1 & j \end{bmatrix},$$

$$Q = \frac{1}{\sqrt{5}}\begin{bmatrix} 1 & 2 & 0 & 0 \\ 0 & 0 & 1 & 2 \\ 0 & 0 & -2 & 1 \\ -2 & 1 & 0 & 0 \end{bmatrix}, \text{ and } Q = \frac{1}{\sqrt{85}}\begin{bmatrix} 8 & 4 & 2 & 1 \\ 1 & 8 & 4 & 2 \\ 2 & 1 & 8 & 4 \\ 4 & 2 & 1 & 8 \end{bmatrix}$$

Optionally, in an embodiment, when M=3 and N=9, the M channels are a first channel, a second channel, and a third channel, the N subcarriers are a first subcarrier, a second subcarrier, a third subcarrier, a fourth subcarrier, a fifth subcarrier, a sixth subcarrier, a seventh subcarrier, an eighth subcarrier, and a ninth subcarrier, and the N high-order modulated signals are a first high-order modulated signal $x_1$, a second high-order modulated signal $x_2$, a third high-order modulated signal $x_3$, a fourth high-order modulated signal $x_4$, a fifth high-order modulated signal $x_5$, a sixth high-order modulated signal $x_6$, a seventh high-order modulated signal $x_7$, an eighth high-order modulated signal $x_8$, and a ninth high-order modulated signal $x_9$; and the transmission module 920 is configured to:

transmit the first high-order modulated signal $x_1$ on the first subcarrier of the first channel;

transmit the second high-order modulated signal $x_2$ on the second subcarrier of the second channel;

transmit the third high-order modulated signal $x_3$ on the third subcarrier of the third channel;

transmit the fourth high-order modulated signal $x_4$ on the fourth subcarrier of the first channel;

transmit the fifth high-order modulated signal $x_5$ on the fifth subcarrier of the second channel;

transmit the sixth high-order modulated signal $x_6$ on the sixth subcarrier of the third channel;

transmit the seventh high-order modulated signal $x_7$ on the seventh subcarrier of the first channel;

transmit the eighth high-order modulated signal $x_8$ on the eighth subcarrier of the second channel; and transmit the ninth high-order modulated signal $x_9$ on the ninth subcarrier of the third channel.

Optionally, the plurality of low-order modulated signals are $s_1$, $s_2$, $s_3$, $s_4$, $s_5$, $s_6$, $s_7$, $s_8$, and $s_9$, and the channel matrix Q is:

$$Q = \frac{1}{\sqrt{21}}\begin{bmatrix} 4 & 2 & 1 & 0 & 0 & 0 & 0 & 0 & 0 \\ 0 & 0 & 0 & 4 & 2 & 1 & 0 & 0 & 0 \\ 0 & 0 & 0 & 0 & 0 & 0 & 4 & 2 & 1 \\ 0 & 0 & 0 & 0 & 0 & 0 & 1 & 4 & 2 \\ 1 & 4 & 2 & 0 & 0 & 0 & 0 & 0 & 0 \\ 0 & 0 & 0 & 1 & 4 & 2 & 0 & 0 & 0 \\ 0 & 0 & 0 & 2 & 1 & 4 & 0 & 0 & 0 \\ 0 & 0 & 0 & 0 & 0 & 0 & 2 & 1 & 4 \\ 2 & 1 & 4 & 0 & 0 & 0 & 0 & 0 & 0 \end{bmatrix}$$

Therefore, the signal transmission apparatus in this embodiment of this application combines the plurality of low-order modulated signals into the N high-order modulated signals, and transmits the N high-order modulated signals on the N subcarriers, where the N subcarriers are the subcarriers on the frequency domain resources of the M channels. For example, the N modulated signals are transmitted on the subcarriers of the M channels. This can improve efficiency of a diversity gain.

Optionally, in an embodiment, the transmission module 920 is configured to:

transmit the N high-order modulated signals on the N subcarriers of N subbands, where the $n^{th}$ subcarrier in the N subcarriers is a subcarrier of an $n^{th}$ subband in the N subbands, and the N subbands are subbands on the frequency domain resources of the M channels.

Optionally, in an embodiment, when N=4, the N subbands are a first subband, a second subband, a third subband, and a fourth subband, the N subcarriers are a first subcarrier, a second subcarrier, a third subcarrier, and a fourth subcarrier, the N high-order modulated signals are a first high-order modulated signal $x_1 = \alpha_1 s_1 + \beta_1 s_2$, a second high-order modulated signal $x_2 = \alpha_2 s_1 + \beta_2 s_2$, a third high-order modulated signal $x_1^* = (\alpha_1 s_1 + \beta_1 s_2)^*$, and a fourth high-order modulated signal $x_2^* = (\alpha_2 s_1 + \beta_2 s_2)^*$, $x_1^*$ is a conjugate of $x_1$, and $x_2^*$ is a conjugate of $x_2$; and the transmission module is configured to:

transmit the first high-order modulated signal $x_1 = \alpha_1 s_1 + \beta_1 s_2$ on the first subcarrier of the first subband;

transmit the second high-order modulated signal $x_2 = \alpha_2 s_1 + \beta_2 s_2$ on the second subcarrier of the second subband;

transmit the third high-order modulated signal $x_1^* = (\alpha_1 s_1 + \beta_1 s_2)^*$ on the third subcarrier of the third subband; and transmit the fourth high-order modulated signal $x_2^* = (\alpha_2 s_1 + \beta_2 s_2)^*$ on the fourth subcarrier of the fourth subband.

Optionally, the plurality of low-order modulated signals are $s_1$ and $s_2$; and the channel matrix Q is $$Q = \begin{bmatrix} \alpha_1 & \beta_1 \\ \alpha_2 & \beta_2 \end{bmatrix},$$

where $$\alpha_1 = \frac{1}{\sqrt{2}}, \beta_1 = \frac{1}{\sqrt{2}}j, \alpha_2 = \frac{1}{\sqrt{2}}, \text{ and } \beta_2 = -\frac{1}{\sqrt{2}}j;$$

or the channel matrix Q is $$Q = \begin{bmatrix} \alpha_1 & \beta_1 \\ \alpha_2 & \beta_2 \end{bmatrix},$$

where $$\alpha_1 = \frac{1}{\sqrt{5}}, \beta_1 = \frac{2}{\sqrt{5}}, \alpha_2 = -\frac{2}{\sqrt{5}}, \text{ and } \beta_2 = \frac{1}{\sqrt{5}}.$$

Optionally, in an embodiment, when N=3, the N subbands are a first subband, a second subband, and a third subband, the N subcarriers are a first subcarrier, a second subcarrier, and a third subcarrier, and the N high-order modulated signals are a first high-order modulated signal $x_1=\alpha_1 s_1+\beta_1 s_2+\gamma_1 s_3$, a second high-order modulated signal $x_2=\alpha_2 s_1+\beta_2 s_2+\gamma_2 s_3$, and a third high-order modulated signal $x_3=\alpha_3 s_1+\beta_3 s_2+\gamma_3 s_3$; and the transmission module 920 is configured to:

transmit the first high-order modulated signal $x_1=\alpha_1 s_1+\beta_1 s_2+\gamma_1 s_3$ on the first subcarrier of the first subband;

transmit the second high-order modulated signal $x_2=\alpha_2 s_1+\beta_2 s_2+\gamma_2 s_3$ on the second subcarrier of the second subband; and transmit the third high-order modulated signal $x_3=\alpha_3 s_1+\beta_3 s_2+\gamma_3 s_3$ on the third subcarrier of the third subband.

Optionally, the plurality of low-order modulated signals are $s_1$, $s_2$, and $s_3$; and the channel matrix Q is $$Q = \begin{bmatrix} \alpha_1 & \beta_1 & \gamma_1 \\ \alpha_2 & \beta_2 & \gamma_2 \\ \alpha_3 & \beta_3 & \gamma_3 \end{bmatrix},$$

where $$\alpha_1 = \frac{4}{\sqrt{21}}, \beta_1 = \frac{2}{\sqrt{21}}, \gamma_1 = \frac{1}{\sqrt{21}}, \alpha_2 = \frac{1}{\sqrt{21}}, \beta_2 = \frac{4}{\sqrt{21}},$$

$$\gamma_2 = \frac{2}{\sqrt{21}}, \text{ and } \alpha_3 = \frac{2}{\sqrt{21}}, \beta_2 = \frac{1}{\sqrt{21}}, \gamma_3 = \frac{4}{\sqrt{21}}.$$

Therefore, the signal transmission apparatus in this embodiment of this application combines the plurality of low-order modulated signals into the N high-order modulated signals, and transmits the N high-order modulated signals on the N subcarriers, where the N subcarriers are the subcarriers on the frequency domain resources of the M channels. For example, the N modulated signals are transmitted on the subcarriers of a plurality of subbands. This can improve efficiency of a diversity gain.

The data storage apparatus 900 in this embodiment of this application may be corresponding to an execution body of the methods in embodiments of this application. In addition, the foregoing and other operations and/or functions of the modules in the data storage apparatus 900 are intended to implement corresponding processes of the foregoing methods and are not described herein for brevity.

The signal transmission apparatus in this embodiment of this application combines the plurality of low-order modulated signals into the N high-order modulated signals, and transmits the N high-order modulated signals on the N subcarriers, where the N subcarriers are the subcarriers on the frequency domain resources of the M channels. This can improve efficiency of a diversity gain.

Figure 22:
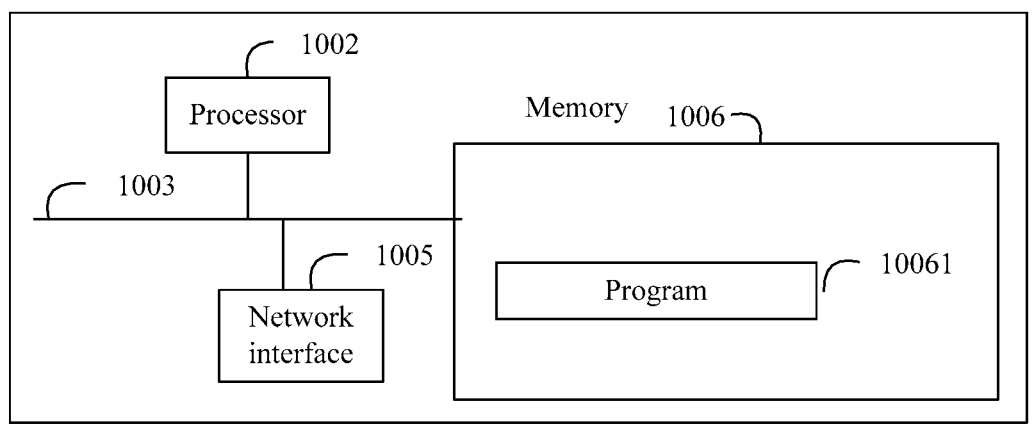
FIG. 22 is a schematic structural diagram of a signal transmission apparatus according to an embodiment of this application.

FIG. 22 shows a structure of a signal transmission apparatus provided in another embodiment of this application. The apparatus includes at least one processor 1002 (for example, a CPU), at least one network interface 1005 or another communications interface, a memory 1006, and at least one communications bus 1003 that is configured to implement connection and communication between these apparatuses. The processor 1002 is configured to execute an executable module stored in the memory 1006, for example, a computer program. The memory 1006 may include a high-speed random access memory (RAM), and may further include a non-volatile memory, for example, at least one disk memory. A communications connection to at least one other network element is implemented by using the at least one network interface 1005 (which may be wired or wireless).

In some implementations, the memory 1006 stores a program 10061. The program 10061 may be executed by the processor 1002.

It should be understood that the term "and/or" in this specification may represent A, B, or both A and B. In addition, the character "/" in this specification generally indicates an "or" relationship between the associated objects.

It should be understood that sequence numbers of the foregoing processes do not necessarily mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, with reference to the examples described in embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a detailed working process of the foregoing system, apparatus, and unit, reference may be made to a corresponding process in the foregoing method embodiments, and details are not described herein again.

In exemplary embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the shown or discussed mutual couplings or direct couplings or communications connections may be implemented by using some interfaces. The indirect couplings or communications connections between the apparatuses or units may be implemented in electrical, mechanical, or other forms.

The units described as separate parts may or may not be physically separated, and parts shown as units may or may not be physical units, may be located in one position, or may be distributed on a plurality of network units. Some or all of the units may be selected depending on actual requirements to achieve objectives of solutions of embodiments.

In addition, functional units in embodiments of this application may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, technical solutions of this application may be implemented in a form of a software product. The computer software product is stored in a storage medium, and includes several instructions for instructing a computer device (which may be a personal computer, a server, a network device, or the like) to perform all or some of the steps of the methods described in embodiments of this application. The storage medium includes any medium that can store program code, such as a Universal Serial Bus (USB) flash drive, a removable hard disk, a read-only memory (ROM), a random access memory (RAM), a magnetic disk, or an optical disc.

The foregoing descriptions are merely exemplary implementations of this application, but are not intended to limit the protection scope of this application. Any variation or replacement readily figured out by a person skilled in the art within the technical scope disclosed in this application may fall within the protection scope of this application.

What is claimed is:

1. A signal transmission method, comprising:
transmitting, by a signal transmission apparatus, N modulated signals on N subcarriers, wherein the N subcarriers are subcarriers on frequency domain resources of M channels, N is an integer greater than or equal to 2, and M is an integer greater than or equal to 2;
wherein the modulated signals transmitted on different channels include conjugates; and
wherein the N modulated signals are based on a channel matrix Q, wherein the channel matrix Q is $$Q = \frac{1}{\sqrt{2}}\begin{bmatrix} 1 & j & 0 & 0 \\ 0 & 0 & 1 & j \\ 0 & 0 & 1 & -j \\ 1 & -j & 0 & 0 \end{bmatrix},$$

where j corresponds to an imaginary unit.

2. The method according to claim 1, wherein a number of subcarriers on each channel is equal to N divided by M.

3. The method according to claim 1, wherein M=2 and N=4, the M channels include a first channel and a second channel, the N subcarriers include a first subcarrier, a second subcarrier, a third subcarrier, and a fourth subcarrier, the N modulated signals include a first modulated signal $x_1$, a second modulated signal $x_2$, a third modulated signal $x_3$, and a fourth modulated signal $x_4$, and transmitting the N modulated signals on N subcarriers comprises:
transmitting the first modulated signal $x_1$ on the first subcarrier, wherein the first subcarrier is a subcarrier of the first channel;
transmitting the second modulated signal $x_2$ on the second subcarrier, wherein the second subcarrier is a subcarrier of the second channel;
transmitting the third modulated signal $x_3$ on the third subcarrier, wherein the third subcarrier is a subcarrier of the first channel; and
transmitting the fourth modulated signal $x_4$ on the fourth subcarrier, wherein the fourth subcarrier is a subcarrier of the second channel.

4. The method according to claim 3, wherein the fourth modulated signal $x_4$ is a conjugate of the first modulated signal $x_1$.

5. The method according claim 3, wherein the third modulated signal $x_3$ is a conjugate of the second modulated signal $x_2$.

6. The method according to claim 3, wherein the fourth modulated signal $x_4$ is a conjugate of the first modulated signal $x_1$ and the third modulated signal $x_3$ is a conjugate of the second modulated signal $x_2$.

7. The method according to claim 1, wherein the N modulated signals comprise high-order modulated signals and low-order modulated signals according to the following expression:

$$\begin{bmatrix} x_1 \\ x_2 \\ x_3 \\ x_4 \end{bmatrix} = \underbrace{\frac{1}{\sqrt{2}}\begin{bmatrix} 1 & j & 0 & 0 \\ 0 & 0 & 1 & j \\ 0 & 0 & 1 & -j \\ 1 & -j & 0 & 0 \end{bmatrix}}_{Q}\begin{bmatrix} s_1 \\ s_2 \\ s_3 \\ s_4 \end{bmatrix},$$

where Q is the channel matrix, $s_1$, $s_2$, $s_3$ and $s_4$ are BPSK modulated signals, $x_1$, $x_2$, $x_3$ and $x_4$ are QPSK modulated signals, $x_3=x_2'$, $x_4=x_1'$, and ( )' corresponds to obtaining a conjugate.

8. A signal transmission apparatus, comprising:
a transmitter; and
a processor;
wherein the processor is configured to cause the transmitter to transmit, on N subcarriers, N modulated signals, wherein the N subcarriers are subcarriers on frequency domain resources of M channels, N is an integer greater than or equal to 2, and M is an integer greater than or equal to 2;
wherein the modulated signals transmitted on different channels include conjugates; and
wherein the N modulated signals are based on a channel matrix Q, wherein the channel matrix Q is $$Q = \frac{1}{\sqrt{2}}\begin{bmatrix} 1 & j & 0 & 0 \\ 0 & 0 & 1 & j \\ 0 & 0 & 1 & -j \\ 1 & -j & 0 & 0 \end{bmatrix},$$

where j corresponds to an imaginary unit.

9. The apparatus according to claim 8, wherein a number of subcarriers on each channel is equal to N divided by M.

10. The apparatus according to claim 8, wherein M=2 and N=4, the M channels include a first channel and a second channel, the N subcarriers include a first subcarrier, a second subcarrier, a third subcarrier, and a fourth subcarrier, the N modulated signals include a first modulated signal $x_1$, a second modulated signal $x_2$, a third modulated signal $x_3$, and a fourth modulated signal $x_4$, and transmitting the N modulated signals on N subcarriers comprises:
transmitting the first modulated signal $x_1$ on the first subcarrier, wherein the first subcarrier is a subcarrier of the first channel;
transmitting the second modulated signal $x_2$ on the second subcarrier, wherein the second subcarrier is a subcarrier of the second channel;
transmitting the third modulated signal $x_3$ on the third subcarrier, wherein the third subcarrier is a subcarrier of the first channel; and
transmitting the fourth modulated signal $x_4$ on the fourth subcarrier, wherein the fourth subcarrier is a subcarrier of the second channel.

11. The apparatus according to claim 10, wherein the fourth modulated signal $x_4$ is a conjugate of the first modulated signal $x_1$.

12. The apparatus according claim 10, wherein the third modulated signal $x_3$ is a conjugate of the second modulated signal $x_2$.

13. The apparatus according claim 10, wherein the fourth modulated signal $x_4$ is a conjugate of the first modulated signal $x_1$ and the third modulated signal $x_3$ is a conjugate of the second modulated signal $x_2$.

14. The apparatus according to claim 8, wherein the N modulated signals comprise high-order modulated signals and low-order modulated signals according to the following expression:

$$\begin{bmatrix} x_1 \\ x_2 \\ x_3 \\ x_4 \end{bmatrix} = \frac{1}{\sqrt{2}} \underbrace{\begin{bmatrix} 1 & j & 0 & 0 \\ 0 & 0 & 1 & j \\ 0 & 0 & 1 & -j \\ 1 & -j & 0 & 0 \end{bmatrix}}_{Q} \begin{bmatrix} s_1 \\ s_2 \\ s_3 \\ s_4 \end{bmatrix},$$

where Q is the channel matrix, $s_1$, $s_2$, $s_3$ and $s_4$ are BPSK modulated signals, $x_1$, $x_2$, $x_3$ and $x_4$ are QPSK modulated signals, $x_3 = x_2'$, $x_4 = x_1'$, and $(\ )'$ corresponds to obtaining a conjugate.

* * * * *